(12) United States Patent
Muralidhar et al.

(10) Patent No.: US 11,138,190 B2
(45) Date of Patent: Oct. 5, 2021

(54) MATERIALIZED VIEWS OVER EXTERNAL TABLES IN DATABASE SYSTEMS

(71) Applicant: Snowflake Inc., Bozeman, MT (US)

(72) Inventors: Subramanian Muralidhar, Mercer Island, WA (US); Benoit Dageville, San Mateo, CA (US); Thierry Cruanes, San Mateo, CA (US); Nileema Shingte, San Mateo, CA (US); Saurin Shah, Kirkland, WA (US); Torsten Grabs, San Mateo, CA (US); Istvan Cseri, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 16/775,110

(22) Filed: Jan. 28, 2020

(65) Prior Publication Data

US 2020/0334231 A1 Oct. 22, 2020

Related U.S. Application Data

(63) Continuation of application No. 16/385,720, filed on Apr. 16, 2019.

(51) Int. Cl.
*G06F 16/23* (2019.01)
*G06F 16/248* (2019.01)
(Continued)

(52) U.S. Cl.
CPC ........ *G06F 16/2393* (2019.01); *G06F 3/0605* (2013.01); *G06F 3/067* (2013.01);
(Continued)

(58) Field of Classification Search
CPC ............. G06F 16/2393; G06F 16/2471; G06F 16/254; G06F 3/0605; G06F 3/0665; G06F 3/067
See application file for complete search history.

(56) References Cited

U.S. PATENT DOCUMENTS

2003/0212664 A1* 11/2003 Breining ................ G06F 16/84
2007/0239797 A1* 10/2007 Cattell .................. G06F 16/217
(Continued)

OTHER PUBLICATIONS

"U.S. Appl. No. 16/385,720, Preliminary Amendment filed Jan. 28, 2020", 12 pgs.
(Continued)

*Primary Examiner* — Robert Stevens
*Assistant Examiner* — Dustin D Eyers
(74) *Attorney, Agent, or Firm* — Schwegman Lundberg & Woessner, P.A.

(57) ABSTRACT

Systems, methods, and devices for generating a materialized view over an external table. A method includes connecting a database platform to an external table such that the database platform has read access for the external table and does not have write access for the external table. The method includes generating, by the database platform, a materialized view over the external table. The method includes receiving a notification that a modification has been made to the external table, the modification comprising one or more of an addition of a file, a deletion of a file, or an update to a file in a source location for the external table. The method includes, in response to the external table being modified, refreshing the materialized view such that the materialized view comprises an accurate representation of the external table.

28 Claims, 18 Drawing Sheets

(51) Int. Cl.
*G06F 16/2458* (2019.01)
*G06F 3/06* (2006.01)
*G06F 16/25* (2019.01)

(52) U.S. Cl.
CPC .......... *G06F 3/0665* (2013.01); *G06F 16/248* (2019.01); *G06F 16/2471* (2019.01); *G06F 16/254* (2019.01)

(56) References Cited

U.S. PATENT DOCUMENTS

| | | |
|---|---|---|
| 2009/0037489 A1 | 2/2009 | Grundler et al. |
| 2010/0036799 A1 | 2/2010 | Bouloy et al. |
| 2010/0036800 A1 | 2/2010 | Gui et al. |
| 2010/0036886 A1 | 2/2010 | Bouloy et al. |
| 2012/0239612 A1* | 9/2012 | George ................ G06F 16/254 707/602 |
| 2013/0246692 A1* | 9/2013 | Macor ................ G06Q 30/018 711/103 |
| 2014/0280028 A1* | 9/2014 | Ding ................ G06F 16/2393 707/717 |
| 2016/0092524 A1* | 3/2016 | Shivarudraiah ... G06F 16/24554 707/602 |
| 2020/0334230 A1 | 10/2020 | Muralidhar et al. |

OTHER PUBLICATIONS

"U.S. Appl. No. 16/385,720, Non Final Office Action dated Jul. 22, 2021", 35 pgs.

* cited by examiner

MATERIALIZED VIEWS OVER EXTERNAL TABLES IN DATABASE SYSTEMS

CROSS-REFERENCE TO RELATED APPLICATIONS

The present application is a continuation of, and hereby claims priority under 35 U.S.C. § 120 to U.S. Non-Provisional patent application Ser. No. 16/385,720, entitled "MATERIALIZED VIEWS OVER EXTERNAL TABLES IN DATABASE SYSTEMS," filed on Apr. 16, 2019.

TECHNICAL FIELD

The present disclosure relates to databases and more particularly relates to external tables in database systems.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented and others.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

Traditional database management requires companies to provision infrastructure and resources to manage the database in a data center. Management of a traditional database can be very costly and requires oversight by multiple persons having a wide range of technical skill sets. Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

There exist multiple architectures for traditional database systems and cloud database systems. One example architecture is a shared-disk system. In the shared-disk system, all data is stored on a shared storage device that is accessible from all processing nodes in a data cluster. In this type of system, all data changes are written to the shared storage device to ensure that all processing nodes in the data cluster access a consistent version of the data. As the number of processing nodes increases in a shared-disk system, the shared storage device (and the communication links between the processing nodes and the shared storage device) becomes a bottleneck slowing data read and write operations. This bottleneck is further aggravated with the addition of more processing nodes. Thus, existing shared-disk systems have limited scalability due to this bottleneck problem.

In some instances, it may be beneficial to access additional data that is stored externally to a central or main database. In an example, a database user may have its data stored on its own internal systems and/or cloud-based database account. The database user may wish to access its own data and may also wish to access additional data that is not stored on the database user's internal systems and/or cloud-based database account. This additional data may be referred to as external data. In some instances, the database user may benefit from querying its own data and the external data in tandem, or in comparing its own data and the external data, or in modifying its own data according to changes made to the external data, and so forth. The external data may be stored in one or more external tables. An external table represents content that is not directly managed by the database. There exist some database structures and file formats that are created to speed up query response times and/or reduce the computing load to execute a database query. One such database structure is a materialized view. Materialized views improve performance of expensive database queries by materializing and reusing common intermediate query results in a workload. A materialized view is a database object that includes the results of a database query and may improve performance of database queries by caching the results of the query. Materialized views can be costly to update and maintain such that efficient use of materialized views can be difficult to achieve.

Disclosed herein are systems, methods, and devices for maintaining, updating, and querying over external tables in database systems. Further disclosed are systems, methods, and devices for generating and refreshing materialized views over external tables in database systems.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where.

DETAILED DESCRIPTION

Figure 1:
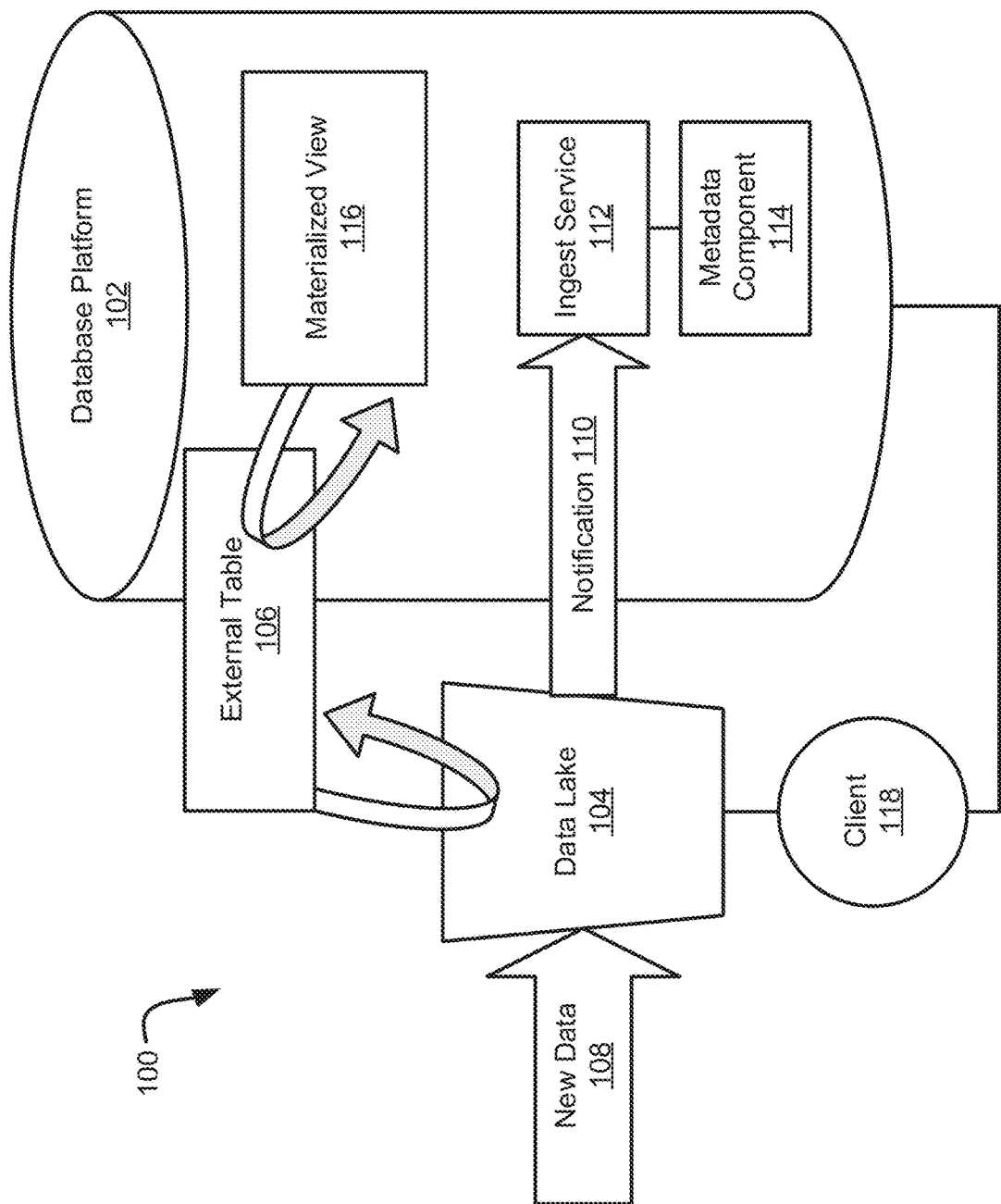
FIG. 1 is a schematic block diagram illustrating a system for generating a materialized view on an external table, according to one embodiment.

The systems, methods, and devices of the disclosure are directed to external tables in database systems. In an embodiment, a database system include a multi-tenant and cloud-based database platform that enables a client (i.e. an account associated with the database platform) to ingest data into the database platform, store data in the database platform, and query the data in the database platform. In certain instances, a client of the database platform may wish to query or analyze data that is stored outside of the database platform and is not directly managed by the database platform. Such data may be referred to herein as "external data" or an "external table."

In an embodiment, the database platform serves as a cloud data warehouse. Data may be stored across shared storage devices of the database platform and may be organized and managed by the database platform. In an embodiment, structured data or semi-structured data may be copied into a data bucket that is in communication with the database platform. The data in the data buckets may be ingested by the database platform and then organized and managed by the database platform. The client may then view and query such data.

However, in some instances, a client may not wish to ingest data into the database platform or may wish to ingest only a portion of data into the database platform. In such an instance, the client may benefit greatly by the database platform reading and performing queries on external data. The external data is not managed directly by the database platform, but the database platform may still query the external data, generate metadata about the external data, generate materialized views about the external data, generate change tracking information about the external data, and so forth.

In an embodiment, a data lake is associated with the database platform and the client loads new data to the data lake. When data is loaded to the data lake or when data in the data lake is modified or updated, the database platform is notified. The database platform generates an external table based on the database platform and further generates and stores metadata about the data in the external table. The database platform may generate materialized views based on the external table and/or execute queries over the external table.

The above embodiment provides significant benefits for a client that does not wish to have data ingested into the database platform but still wishes to perform operations on the data by using the database platform. In an example, a client has adopted an external data storage platform as its data lake. In the example, the external data storage platform is cloud-based storage where data, including photos, videos, documents, tables, and other files, may be uploaded and stored. In an embodiment, the external data storage platform is a storage service that is referred to as a "data bucket" in some instances. In the example, the client has adopted the external data storage platform as its data lake and wishes to consider the external data storage platform as its only source of truth for its data. The client does not wish to copy any data into the database platform. According to the systems, methods, and devices described herein, the client may still enjoy the benefits of using the database platform without ingesting data into the database platform. The client may create an external table based on a selection of files on the data bucket or based on all files in the data bucket. The external table may be provided to the database platform in a read-only manner such that the external table is not managed or manipulated by the database platform. According to the embodiments disclosed herein, the client can use the database platform to generate and update metadata about data in the external table, query the external table, and generate materialized views over the external table.

In a further example, a client wishes to use a mixture of external and internal data, relative to the database platform. The client may wish to store a first portion of its data in a data bucket with an external data storage platform such that the data bucket serves as the client's data lake for the first portion of its data. The client may wish to store raw data in the data bucket (serving as the client's data lake) such as images, videos, non-partitioned tables, and other files. The client may also wish to store a second portion of its data with the database platform such that the database platform serves as the client's data warehouse. The data stored in the data warehouse (i.e., managed by the database platform) is curated and organized to allow for highly granular querying, sophisticated change tracking, and finely tuned analytics. In the example, the client may be motivated to have its data stored in two locations for a number of reasons. One such reason is that the client may operate programs or applications that prefer to access data from the data lake rather than a data warehouse, or in some instances may not be capable of accessing data from a data warehouse. Another reason may be that the raw data stored in the data bucket cannot be processed by the database platform. Another such reason may be that some types of data (e.g., applications logs of data-based events or actions in a system, network, or information technology environment) are generated frequently and rarely analyzed. The client may find it is inefficient to maintain a data ingestion pipeline with the database warehouse for application logs or other data that is unlikely to be queried frequently. Another reason may be that the client does not wish for certain data to be outside of its virtual private cloud for security reasons. Another reason may be that the client needs certain datasets to expire after a set amount of time, and it may be challenging to purge those datasets from the database warehouse. Another reason may be that the client wishes to use an open file format such as Apache Parquet such that the data is directly accessible to other applications without needing to access a data warehouse.

The above examples illustrate the benefits of the systems, methods, and devices described herein for maintaining and querying over an external table. The described systems, methods, and devices enable a database platform to generate metadata about external data that is stored outside the database platform and is not managed by the database platform. Additionally, the systems, methods, and devices described herein enable the database platform to query the external data based on metadata that is stored internally with the database platform. Additionally, the described systems, methods, and devices described herein enable a database platform to generate materialized views over the external data and refresh those materialized views in response to changes to the external data.

In an embodiment, a method for maintaining an external table in a database system is disclosed. The method includes receiving, by a database platform, read access to content stored in a data storage platform that is separate from the database platform. The method includes defining an external table based on the content stored in the data storage platform. The method includes connecting the database platform to the external table such that the database platform has read access for the external table and does not have write access for the external table. The method includes generating metadata for the external table, the metadata comprising information about data stored in the external table. The method includes receiving a notification that a modification has been made to the content of the data storage platform, the modification comprising one or more of an insert, a delete, or an update. The method includes refreshing the metadata for the external table in response to the modification being made to the content of the data storage platform.

In an embodiment, a method of querying over an external table is disclosed. The method includes connecting a database platform to an external table such that the database platform has read access for the external table and does not have write access for the external table. The method includes receiving a query, the query directed at least to data in the external table. The method includes determining, based on metadata, one or more files in the external table comprising data satisfying the predicate. The method includes pruning, based on the metadata, all files in the external table that do not comprise any data satisfying the query. The method includes generating a query plan comprising a plurality of discrete subtasks. The method includes assigning, based on the metadata, the plurality of discrete subtasks to one or more nodes in an execution platform.

In an embodiment, a method for generating a materialized view over an external table is disclosed. The method includes connecting a database platform to an external table such that the database platform has read access for the external table and does not have write access for the external table. The method includes generating, by the database platform, a materialized view over the external table. The method includes receiving a notification that a modification has been made to the external table, the modification comprising one or more of new data being added to the external table or existing data in the external table being deleted or modified. The method includes in response to the external table being modified, refreshing the materialized view such that the materialized view comprises an accurate representation of the external table.

A client of a database platform may wish to store data in a data warehouse and/or a data lake. A data lake is a storage repository that can hold a vast amount of raw data in its native format. A data lake may serve as a single store of all data for a client, ranging from raw data (which may be an exact copy of source system data) to transformed data. The transformed data may be used for reporting, analysis, visualization, machine learning, and so forth. A data lake may be suited for storing a large sum of data that may never make it into a data warehouse where it is managed, curated, and queried. Data lakes may store raw uncleansed data and may be optimized for permitting the client to upload data in whatever format is convenient for the client. In some implementations, data lakes present a file and file system abstraction that allows for a large set of applications to operate on the data.

A data warehouse may store cleansed data in well-defined formats. The data in a data warehouse may be organized and optimized for analytics to enable highly granular querying and other processes. Data warehouses may include relational schemas and more constrained processing modes so there are fewer applications that can operate on data stored in a data warehouse relative to data stored in a data lake.

In some instances, a data warehouse can be expensive to maintain. The client of the database platform may wish to store a bulk of its data in a data lake and only store curated and transformed data in a data warehouse. Embodiments of the present disclosure enable the client to store its data across a data lake and a data warehouse. Additionally, embodiments of the disclosure enable the client to store its data in a data lake and still enable the database platform to query and analyze the data in the data lake.

In some instances, it may be desirable to generate one or more materialized views over an external table. This may be particularly beneficial where a client wishes to query data in the external table that is stored externally to a database platform and is not managed by the database platform. Because the external data is not managed by the database platform, it may be particularly difficult or inefficient to access and/or read the external data. A materialized view is a database object that includes the results of a query. A materialized view may be a local copy of data that is located remotely or may be a subset of the rows and/or columns of a table or join result or may include a summary using an aggregate function. The process of generating a materialized view may be referred to as materialization. Materialization is a form of caching the results of a query to a concrete "materialized" table that can be updated based on changes made to the original base table (in this case, the base table is the external table). The materialized view enables efficient access and decreases the amount of time and computing resources that are required to respond to a query. If the same query parameters are requested again, the materialized view may be referenced rather than the base table (i.e. the external table). The materialized view is managed by the database platform and can be read more quickly and efficiently than the external storage where the external table is located.

In an example, a client wishes to maintain all data in a data lake that is external to a database platform. The client wishes to use the database platform to analyze and query the data that is stored in the data lake. The database platform does not manage the data lake. According to the systems, methods, and devices disclosed herein, the client may create an external table that is stored in the data lake and is accessible to the database platform. The database platform may generate one or more materialized views over the external table such that the one or more materialized views are stored, managed, and refreshed by the database platform. When the client sends a query request to the database platform, the database platform may respond to the query by reading the external table directly from the data lake. However, to reduce the amount of time and processing resources that are required to respond to the query, the database platform may instead respond to the query by referencing the one or more materialized views that are generated over the external table.

In an embodiment, and further to the above example, the database platform responds to the query by referencing metadata about the external table. The metadata is generated, maintained, stored, and refreshed by the database platform. The metadata is information about the data within the external table. The metadata includes information about how the data in the external table is stored. In an embodiment, the data in the external table (stored in the external storage platform) may be organized as a source directory hierarchy where the leaves of the hierarchy are files. Each source directory can include one or more files and the source directory can be modeled as a partition on the external table. The external table may include millions of rows of data and may be very large and difficult to store or read. In an example, the external table is divided into six distinct partitions, and each of the six partitions includes a portion of the data in the external table. Dividing the external table data into multiple partitions helps to organize the data and to find where certain data is located within the table.

An analogy to the partitions of the external table may be different storage buildings within a storage compound. In the analogy, the storage compound is similar to the external table, and each separate storage building is similar to a partition. Hundreds of thousands of items are stored throughout the storage compound. Because so many items are located at the storage compound, it is necessary to organize the items across the multiple separate storage buildings. The items may be organized across the multiple separate storage buildings by any means that makes sense. For example, one storage building may store clothing, another storage building may store household goods, another storage building may store toys, and so forth. Each storage building may be labeled so that the items are easier to find. For example, if a person wants to find a stuffed bear, the person will know to go to the storage building that stores toys. The storage building that stores toys may further be organized into rows of shelving. The toy storage building may be organized so that all stuffed animals are located on one row of shelving. Therefore, the person looking for the stuffed bear may know to visit the building that stores toys and may know to visit the row that stores stuffed animals. Further to the analogy with database technology, each row of shelving in the storage building of the storage compound may be similar to a column of database data within a partition of the external table. The labels for each storage building and for each row of shelving are similar to metadata in a database context.

Similar to the analogy of the storage compound, the partitions disclosed herein can provide considerable benefits for managing data, finding data, and organizing data. Each partition organizes data into rows and columns and stores a portion of the data associated with an external table (or a database table that is stored and managed by the database platform). One external table or internal table may have many partitions. The partitioning of the database data among the many partitions may be done in any manner that makes sense for that type of data. For example, if the client is a credit card provider and the data is credit card transactions, the table may include columns such as credit card number, account member name, merchant name, date of card transaction, time of card transaction, type of goods or services purchased with card, and so forth. The table may be stored within a data lake or data warehouse that is external to the database provider and is not managed or updated by the database provider. The table may include millions of credit card transactions spanning a significant time period, and each credit card transaction may be stored in one row of the table. Because the table includes many millions of rows, the table may be partitioned into partitions. In the case of credit card transactions, it may be beneficial to split the table based on time. For example, each partition may represent one day or one week of credit card transactions. It should be appreciated that the table may be partitioned into partitions by any means that makes sense for the database client and for the type of data stored in the table. The partitions provide significant benefits for managing the storage of the millions of rows of data in the table, and for finding certain information in the table.

A query may be executed on an external or internal table to find certain information within the table. Further to the above example of the credit card transactions, a query may seek to find all transactions for a certain vendor across a certain time period. For example, a client (in this example, the credit card provider) may send a query to the database provider and ask for a report of all credit transactions that occurred at Retail Store A in the months of January, April, and May. In the example, these credit card transactions are stored in an external table that is not managed or updated by the database platform. To respond to the query, a resource manager (see 302) of the database platform must scan the external table to find each of the applicable credit card transactions. The external table may include millions and millions of rows, and it would be very time consuming and it would require significant computing resources for the resource manager to scan the entire external table. The partition organization along with the systems, methods, and devices for external table metadata storage as disclosed herein provide significant benefits by shortening the query response time and reducing the amount of computing resources that are required for responding to the query.

Further to the above example, the resource manager must respond to the query that requested all credit card transactions at Retail Store A in the months of January, April, and May. The credit card transactions are stored in an external table that is not managed or updated by the database platform or the resource manager. The resource manager may find the cells of data by scanning external table metadata. The external table metadata includes information about the data stored within the external table, but the external table metadata is generated, stored, and refreshed by the database platform and is considered "internal" to the database platform. The multiple level database metadata as described herein (see e.g. FIG. 10) enables the resource manager to quickly and efficiently find the correct data to respond to the query. The resource manager may find the correct table by scanning cumulative table metadata (see 1002) across all the multiple tables in the client's database. The resource manager may find a correct grouping of partitions by scanning multiple grouping expression properties (see 1014a-1014d) across the identified table. The grouping expression properties include information about data stored in each of the partitions within the grouping. The resource manager may find a correct partition by scanning multiple partition expression properties within the identified grouping of partitions. The resource manager may find a correct column by scanning one or more column expression properties within the identified partition. The resource manager may find the correct row(s) by scanning the identified column within the identified partition. Further to the example involving the credit card transactions, the resource manager may scan multiple cumulative table metadata to find a table that includes credit card transactions. The resource manager may scan the grouping expression properties to find groupings that have data for the months of January, April, and/or May. For example, the resource manager finds a grouping that includes credit card transactions for the month of January (and may further include transactions for other months). The resource manager reads the partition expression properties for that grouping to find one or more individual partitions that include transactions for the month of January. The resource manager reads column expression properties within each of the identified individual partitions. The resource manager scans the identified columns to find the applicable rows that have a credit card transaction for Retail Store A in the month of January (or April or May). The metadata points the resource manager to the correct external table and to the correct partition of the external table. The metadata may further point the resource manager to the correct rows of that partition of the external table. By scanning the metadata that is stored internally to the database platform, the resource manager may quickly find where the correct data is stored within the external table.

As illustrated in the above example, the metadata organization as disclosed herein provides significant benefits to hasten the query response time and enables the resource manager to quickly identify the correct external table, the correct partition within the external table, and the correct columns and rows within the external table to respond to a query. The novel metadata storage as disclosed herein provides a multiple level metadata structure for maintaining information about partitions in an external table.

Before the methods, systems, and devices for a database platform to perform operations over an external table are disclosed and described, it is to be understood that this disclosure is not limited to the configurations, process steps, and materials disclosed herein as such configurations, process steps, and materials may vary somewhat. It is also to be understood that the terminology employed herein is used for describing implementations only and is not intended to be limiting since the scope of the disclosure will be limited only by the appended claims and equivalents thereof.

To provide further background to the disclosures provided herein, a table (including an external table or an internal database table) is a collection of related data held in a structured format and may include columns and rows. A table may be altered in response to a data manipulation (DML) command such as an insert command, a delete command, an update command, a merge command, and so forth. Such modifications may be referred to as a transaction that occurred on the table. In an embodiment, each transaction includes a timestamp indicating when the transaction was received and/or when the transaction was fully executed. In an embodiment, a transaction includes multiple alterations made to a table, and such alterations may impact one or more partitions in the table. In an embodiment, data may be continuously ingested, or may be ingested at determined time intervals, and the ingestion of data into the table is a transaction occurring on the table. In an embodiment, each time a transaction is executed on the table, a new table version is generated that includes one or more new partitions. Further, each time a transaction is executed on the table, or after a threshold number of transactions are executed on the table, the metadata for the table may need to be updated to reflect the new or updated data stored in the table.

A table may store data in a plurality of partitions, wherein the partitions are immutable storage devices. When a transaction is executed on a such a table, all impacted partitions are recreated to generate new partitions that reflect the modifications of the transaction. After a transaction is fully executed, any original partitions that were recreated may then be removed from the table. A new version of the table is generated after each transaction that is executed on the table. The table may undergo many versions over a time period if the data in the table undergoes many changes, such as inserts, deletes, updates, and/or merges. Each version of the table may include metadata indicating what transaction generated the table, when the transaction was ordered, when the transaction was fully executed, and how the transaction altered one or more rows in the table. The disclosed systems, methods, and devices for low-cost table versioning may be leveraged to provide an efficient means for updating table metadata after one or more changes (transactions) have occurred on the table. Such systems, methods, and devices may be implemented for generating metadata that is stored internally with a database platform, wherein the metadata includes information about data stored in an external table that is not managed or updated by the database platform.

In one embodiment, metadata is stored and maintained on non-mutable storage services (may be referred to herein as micro-partitions) in the cloud. These storage services may include, for example, Amazon S3 @, Microsoft Azure Blob Storage®, and Google Cloud Storage®. Many of these services do not allow to update data in-place (i.e., are non-mutable or immutable). Data micro-partitions may only be added or deleted, but never updated. In one embodiment, storing and maintaining metadata on these services requires that, for every change in metadata, a metadata partition is added to the storage service. These metadata micro-partitions may be periodically consolidated into larger "compacted" or consolidated metadata micro-partitions in the background.

In an embodiment, all data in tables is automatically divided into an immutable storage device referred to as a micro-partition. The micro-partition may be considered a batch unit where each partition has contiguous units of storage. By way of example, each micro-partition may contain between 50 MB and 500 MB of uncompressed data (note that the actual size in storage may be smaller because data may be stored compressed). Groups of rows in tables may be mapped into individual partitions organized in a columnar fashion. This size and structure allow for extremely granular selection of the partitions to be scanned, which can be comprised of millions, or even hundreds of millions, of micro-partitions. This granular selection process may be referred to herein as "pruning" based on metadata. Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, partitioning may be automatically performed on all tables. For example, tables may be transparently partitioned using the ordering that occurs when the data is inserted/loaded.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, a database table is a collection of records (rows). Each record contains a collection of values of table attributes (columns). Database tables are typically physically stored in multiple smaller (varying size or fixed size) storage units, e.g. files or blocks.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

Referring now to the figures, FIG. 1 illustrates a schematic block diagram of a system 100 for generating, refreshing, and querying an external table. The system 100 includes a database platform 102. The database platform 102 may be a cloud-based database computing platform for storing, organizing, maintaining, and querying database data. The database platform 102 may be in communication with multiple client accounts. An embodiment of the database platform 102 includes the system 300 illustrated in FIG. 3. The database platform 102 is in communication with a data lake 104 that receives data from a client 118. The data lake 104 may include a cloud-based data storage resource that may receive files and raw data in its native format.

An external table 106 may be generated based on data within the data lake 104. The external table 106 includes structured or semi-structured data. The external table 106 is accessible to the database platform 102 but is not managed or updated by the database platform 102. In an embodiment, the external table 106 is stored within the data lake 104 and the structure and organization of the external table 106 is defined by the client 118. In an embodiment, the structure and organization of the external table 106 is defined by the database platform 102. The data lake 104 includes a store of data that is managed by the client 118, wherein the client 118 is associated with the data lake 104 and the database platform 102. The data lake 104 may be external to the database platform 102 such that the database platform 102 does not have the ability or authorization to write or manipulate the data within the data lake 104. The database platform 102 may have permissions to read the data stored in the data lake 104, query the data stored in the data lake 104, and/or receive an indication when the data lake 104 is updated.

In an embodiment, the external table 106 is generated based on a source directory in the data lake 104. The source directory in the data lake 104 may alternatively be referred to as a namespace or source file. The source directory may be identified by the client 118 and the client may manually indicate that new data should be uploaded to the source directory. The data lake 104 is a system or repository of data. Data within the data lake 104 may be stored in a structured or unstructured state at any scale. The data may be stored as-is without first structuring the data. In an embodiment, the data lake 104 is a single store of all enterprise data for the client 118, including raw copies of source system data and transformed data that may be utilized for tasks such as reporting, visualization, analytics, machine learning, and so forth. In an embodiment, the data lake 104 includes structured data from relational databases (i.e. rows and columns), semi-structured data, unstructured data (e.g. emails, documents, and so forth), and binary data (e.g. images, audio, video, and so forth). The data lake 104 may manage big data for the client 118 by providing a single point of collecting, organizing, and sharing data.

The data lake 104 may be distinguished from a data warehouse. However, in certain embodiments, a data warehouse may be utilized rather than a data lake 104 is illustrated in FIG. 1. A data warehouse includes a database optimized to analyze relational data coming from transaction systems and line of business applications. In a data warehouse, the data structure and schema may be defined in advance to optimize for fast queries. The data in a data warehouse may be cleaned, enriched, and transformed such that it acts as a single source of truth. The data lake 104 may store relational data from line of business applications and non-relational data from, for example, mobile applications, internet of things devices, and social media. In a data lake 104, the structure or schema of the data may not be defined when data is captured such that all data may be stored without careful design. In certain implementations, it may be beneficial to employ both a data warehouse and a data lake, and such an implementation may benefit from the systems, methods, and devices for generating a materialized view based on an external table, as disclosed herein.

The data lake 104 may import any amount of new data 108 that may be ingested in real time. The new data 108 may be collected from multiple sources and moved to the data lake 104 in its original format. This process may permit the data lake 104 to scale data of any size while saving time defining data structures, schema, and transformations. The data lake 104 may provide an ability to understand what data is stored in the data lake 104 through crawling, cataloging, and indexing the data. The data within the data lake 104 may be secured and encrypted to ensure the data is protected.

The data lake 104 provides directories for the external table 106 and materialized view 116. The directories may be stored in a different file format than the tables stored in the shared storage devices of the database platform 102. The directories of the data lake 104 may be stored in a cloud storage system such as Amazon Web Services™, Microsoft Azure™, and so forth. The data lake 104 may be separate and independent of the database platform 102 (see e.g. FIGS. 3-5).

The client 118 may add new data 108 to the data lake 104. The new data 108 may be in any file format In an embodiment, the new data 108 must be in a specific file format to be read by the database platform 102 or to be incorporated into the external table 106. In an embodiment, the database platform 102 includes shared storage devices for storing database data (this may be referred to as "internal" data that is managed by the database platform 102). The client 118 may have data stored in the data lake 104 and may further have different or replicated data that is stored in the shared storage devices of the database platform 102. In an embodiment, the data stored in the data lake 104 and the data stored in the shared storage devices of the database platform 102 have different file formats. In such an embodiment, the database platform 102 may be configured to read the different formats for data stored in the data lake 104 and/or convert those different formats to the same data format used by the database platform 102.

When the new data 108 is added to the data lake 104, a notification 110 is generated and provided to an ingest service 112 of the database platform 102. The notification 110 includes an indication that the new data 108 has been added to the data lake 104. The notification 110 may be automatically generated by the data lake 104, may be automatically or manually generated by the client, may be automatically or manually retrieved by the database platform 102, and so forth. In an embodiment, the database platform 102 queries the data lake 104 at threshold periods to determine whether new data 108 has been added to the data lake 104. In an embodiment, the notification 110 is provided to the ingest service 112 to indicate that new data 108 has been received by the data lake 104. The ingest service 112 may prompt an update to be made to the external table 106 and further to a materialized view 116 based on the new data 108.

The ingest service 112 receives notifications from the data lake 104 that an update has been made do data stored within the data lake 104. The ingest service 112 may receive a notification that data within the source directory (may alternatively be referred to as a namespace or source file) in the data lake has been updated. The ingest serve 112 updates metadata for the external table 106 to reflect any modifications made to the data lake 104 data.

The new data 108 is read and/or retrieved by the ingest service 112 of the database platform 102. The new data 108 is stored in an external table 106. The external table may be in communication with the database platform 102 but may not be managed by the database platform. In an embodiment, the database platform 102 can read data in the external table 106 but cannot write data to the external table 106. In an embodiment, the client 118 manages the external table 106 and provides access to the external table 106 to the database platform 102. In an embodiment, the external table 106 is managed and/or provided by a cloud-based data warehousing service that may be separate and independent of the database platform 102. When new data 108 is added to the data lake 104, the external table 106 is updated to reflect the new data 108.

The database platform 102 may generate one or more materialized views 116 based on the external table 106. A materialized view 116 over the external table 106 may be managed by the database platform 102 and may be stored in the plurality of shared storage devices (see e.g. 308) that are associated with the database platform 102. When new data 108 is added to the data lake 104, the external table 106 is updated and the materialized view 116 over the external table 106 is refreshed.

The database platform 102 generates the materialized view 116 over the external table 106. The generation of the materialized view 116 over the external table 106 may be decomposed into two steps. In a first step, a non-materialized external table is generated. In a second step, a materialized view is generated over the non-materialized external table. In certain implementations, it may be beneficial to decompose the non-materialized external table from the materialized view as disclosed herein. Decomposing may allow for multiple different materialized views to be generated, and each of the multiple materialized views may include a different selection of data, different projections, different summaries, and so forth, without first materializing all of the source data.

The combination of a non-materialized external table 106 and a materialized view 116 over the external table 106 may be beneficial in implementations where a large amount of data is already stored in a data lake 104 and only the most recent subset of that data is frequently queried. In such an implementation, it may be cost-prohibitive to materialize all of the data in the data lake 104. Further, generating a materialized view over an external table may permit materialization of only the portion of the data in the data lake 104 that is queried most frequently.

The metadata component 114 generates and refreshes metadata based on the data in the data lake 104 and/or the external table 106. The metadata is generated, managed, stored, and refreshed by the database platform 102. The metadata is information about the data stored in the data lake 104 and/or the external table 106. The metadata may be organized according to the improved metadata systems disclosed herein, for example those depicted in FIG. 10 and FIGS. 11A-IIC. The metadata includes information about the data stored in the data lake 104 and/or the external table 106 such that a resource manager (see e.g. 302) of the database platform 102 can execute queries over the external table 106 without reading all data in the external table.

The metadata component 114 further generates and refreshes metadata about the materialized view 116. When the data lake 104 and/or the external table 106 are updated, the materialized view 116 may be refreshed to reflect the updates. The metadata may further be refreshed by the metadata component 114 to reflect the updates made to the materialized view 116. When the client 118 queries the external table 106, the resource manager (see 302) of the database platform 102 may execute the query on the materialized view 116 if a materialized view 116 exists that can respond to the query. The database platform 102 expends less time and processing resources when the query is executed over the materialized view 116 rather than the external table 106 itself.

In an embodiment, the data in the external table 106 is organized into partitions that constitute immutable storage devices. In an embodiment, the data in the external table 106 is organized into mutable storage devices that can be updated in-place, but the database platform 102 interacts with the external table 106 as if the data cannot be updated in-place. The data in the external table 106 may be stored in a file format that is different from those file formats commonly used for internal data associated with the database platform. The resource manager 302 of the database platform 102 can scan the metadata to determine which partitions in the external table 106 need to be consumed to respond to a query.

In an embodiment, the client 118 issues a command to the database platform to create the external table 106 and the command does not define a schema for the external table 106. In such an embodiment, the external table 106 is generated with no schema defined with the table definition. The external table 106 may include a variant column and all data in the external table 106 may be queried using the smart column.

The client 118 may query external table 106 metadata by way of various methods. In an embodiment, a view shows all external tables in the database. The columns in such a result are similar to those of regular tables, while the external table 106 will have additional columns. In an embodiment, the external table 106 includes a notification channel column that specifies a resource name of a simple queue service (SQS) queue that is created in the back end such that a client account may setup automatic addition of files to the external table 106. In an embodiment, the external table 106 includes a location column that specifies the location which the external table 106 is configured with.

A metadata view indicates the directories that supply data to the external table 106. Where the source of the data is the data lake 104, new files may be added at any time, old files may be deleted at any time, and files may be updated at any time. In such an embodiment, it may be beneficial to generate a metadata view of all files that supply data to the external table 106. In an embodiment, all directories for the external table 106 are tracked and such data is available to view in an information schema. directories that are de-registered or deleted may be removed from the metadata view.

The materialized view 116 may be generated over an external table 106 to provide for faster query response time. The materialized view 116 may be automatically and incrementally updated to ensure that data is always up-to-date with a primary source of truth, such as a source directory in the data lake 104. The fast query 116 may be processed against the materialized view 116 to improve query response time on frequently used data.

Figure 2:
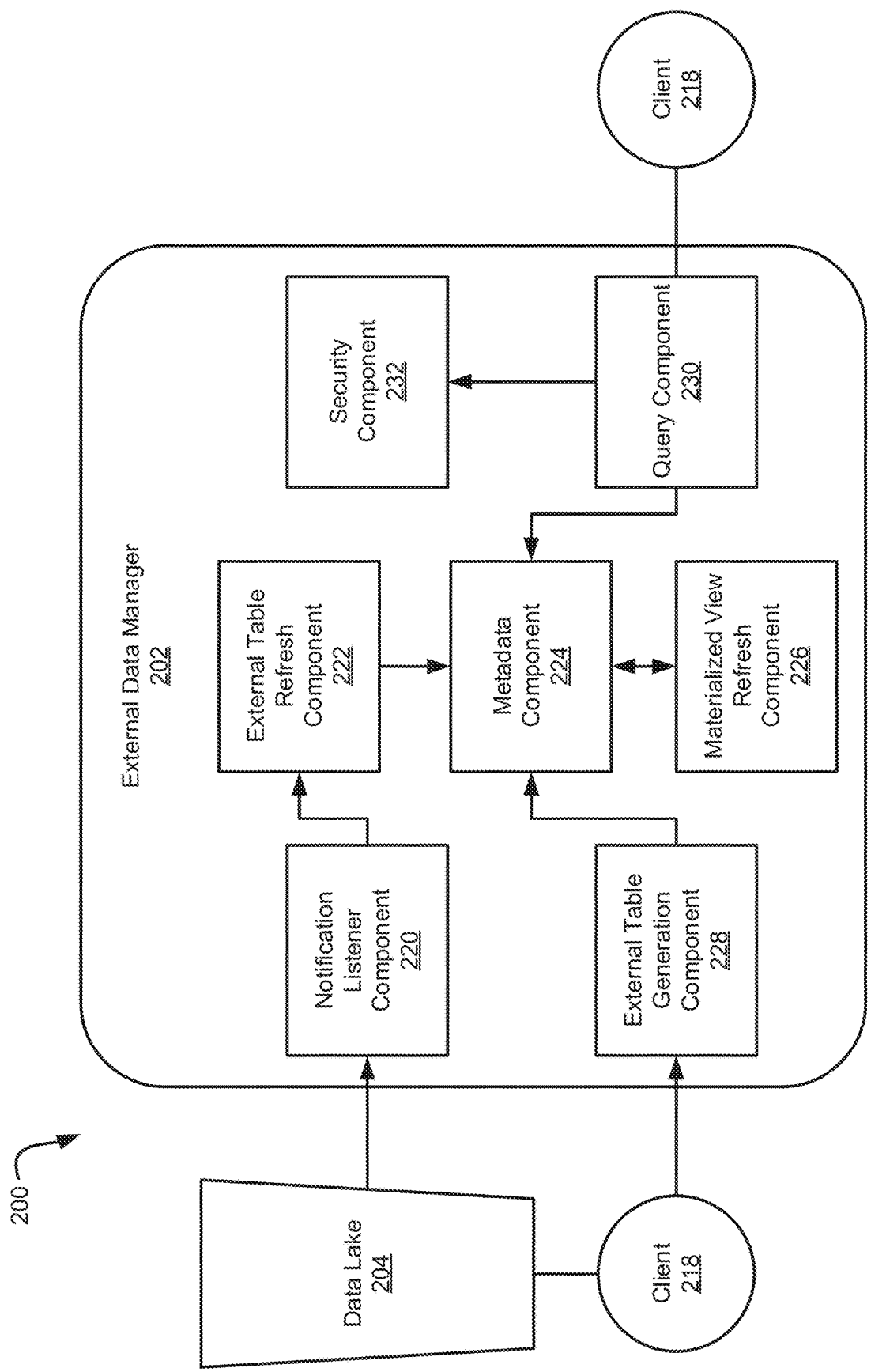
FIG. 2 is a schematic block diagram illustrating a process flow involving an external data manager, according to one embodiment.

FIG. 2 is a schematic block diagram of a process flow 200 for managing external tables in a database platform 102. The system 200 includes an database platform 102 in communication with a data lake 204 and a client 218. The database platform 102 may be incorporated into a resource manager (see e.g. 302) of a database platform 102 as disclosed herein.

The client 218 is in communication with a data lake 204 that is managed by or connected with the client 218 and is external to the database platform 102. In an embodiment, the database platform 102 is in communication with the data lake 204 such that the database platform 102 can read data written to the data lake 204 but cannot write data to the data lake 204. The database platform 102 may be incorporated into a cloud-based database computing platform and the data lake 204 may constitute a separate and independent cloud-based storage structure.

In the process flow 200, the client 218 adds data to the data lake 204. A notification listener component 220 receives an indication that data was added to the data lake 204. The notification may be generated automatically or manually by the data lake 204 or the client 218, The notification listener component 220 provides an indication to an external table refresh component 222 that data was added to the data lake 204 and an external table should be refreshed or updated to reflect the new data that was added to the data lake 204. The notification listener component 220 may be in communication with a source table in the data lake 204 that serves as a source table for an external table that may be queried by the database platform 102. The client 218 may define the source table in the data lake 208 and the notification listener component 220 may receive a notification whenever data is added to or updated in the source table.

The external table refresh component 222 refreshes an external table that is readable to the database platform 102. In an embodiment, the database platform 102 is a component of a cloud-based database computing platform that organizes database data (that is managed and stored by the cloud-based database computing platform) into immutable storage devices referred to herein as partitions. In such an embodiment, the data added to the data lake 204 may not be organized into partitions. The external table refresh component 222 may specify one or more partitions for the external table based on the new data that was added to the data lake 204. In an embodiment, the data in the data lake 204 is of a different file format compared with internal data that is managed by the cloud-based database platform. The external table refresh component 222 may be configured to read and understand multiple file formats and translate data into the same file format that is used by the cloud-based database platform.

The metadata component 224 generates, organizes, and stores metadata about the data stored in the external table. The metadata is based on the partitions for the external data that are specified by the external table refresh component 222. Example structures for the metadata can be seen in FIG. 10 and FIGS. 1A-11C. In an embodiment, the client 218 specifies a hierarchical structure for the data within the external table. The client 218 may specify how folders and subfolders will be organized for the external data, how the data will be partitioned into rows and columns, and/or how the external data will be partitioned into partitions. In an example, the client 218 may store insurance information in the external table. In the example, the client 218 may specify that the data should be organized with separate columns for the year, month, date, and time of an insurance transaction. The client 218 may specify that the insurance transactions should be organized by location such that each state or region is stored in a different partition. In an embodiment, the client 218 uploads a file to a specific folder in the data lake 204, and the location of the file guides the metadata component 224 to generate the correct metadata for the file.

In an embodiment, the metadata component 224 generates change tracking metadata for a partition in the external table that has been modified. The notification listener component 220 may receive an indication that a certain file in the data lake 204 was modified. The certain subfolder within the source directory may provide data for a certain partition in the external table. Based on the notification, database platform may update the metadata about the external table.

The materialized view refresh component 226 updates a materialized view that is generated over the external table. The materialized view may be stored and managed by the cloud-based database computing platform that is separate from the data lake 204. The materialized view is refreshed to reflect any new data added to the data lake 204 and/or to reflect any updates made to the external data, such as merges or deletes.

The external table generation component 228 generates an external table based on data within the data lake 204. The external table may be defined by the external table generation component 228 or the client 218. In an embodiment, the client 218 provides the database platform 102 with access to a source directory in the data lake 204 and indicates that an external table should be generated based on the source directory.

In an embodiment, the client 218 provides an indication of a hierarchical structure in the source directory, wherein the hierarchical structure may have been manually defined by the client 218. The hierarchical structure may indicate organization for the data in the source directory, including folders and subfolders for the data. In an example, the client 218 may indicate that one folder includes all credit card transactions for the year 2019. The client 218 may further indicate that a first subfolder includes all credit card transactions for January in the year 2019, a second subfolder includes all credit card transactions for February in the year 2019, and so forth. The client may further provide an indication of a partitioning structure for the external table that will be based on the source directory. The partitioning structure may indicate how data in the external table should be organized into columns, rows, and partitions. The external table generation component 228 may define the external table based on the hierarchical structure, the partitioning structure, and where the files are uploaded within the folders and subfolders of the hierarchical structure.

In an example, the client 218 indicates that the partitions in the external table should be organized based on location such that all credit card transactions in the state of California are in one partition, all credit card transactions in the state of Maine are in a different partition, and so forth. The client 218 may further indicate that the partitions in the external table should further be organized based on the timestamp for the credit card transaction. The client may upload credit card transactions for the state of California in the month of April in the year of 2019 in a folder for California, in a subfolder for the year of 2019 in California, and further in a subfolder for the month of April in the year of 2019 in California. Based on the hierarchical structure and the partitioning structure, the external table generation component 228 defines a partition in the external table that includes data for credit card transactions in California in April of 2019.

Folders and subfolders may be stacked within the source directory of the data lake and may be defined by the client. When data is uploaded to a certain subfolder in the source directory, the external table generation component 228 defines the external table based on where the data was uploaded in the context of the hierarchical structure and the partitioning structure that were defined by the client.

The query component 230 receives a query from the client 218. The query component 230 scans the metadata to determine one or more partitions that are necessary to respond to the query. In an embodiment, at least one of the one or more partitions is stored in an external table that is not managed or stored by the cloud-based database computing platform. The query component 230 parses execution of the query into a plurality of discrete subtasks and assigns the discrete subtasks to multiple nodes of an execution platform. The execution platform executes the query.

The security component 232 manages permissions for the external table. When the database platform 102 has permission to view data in the external table, the query component 218 can access that data to respond to the query.

Figure 3:
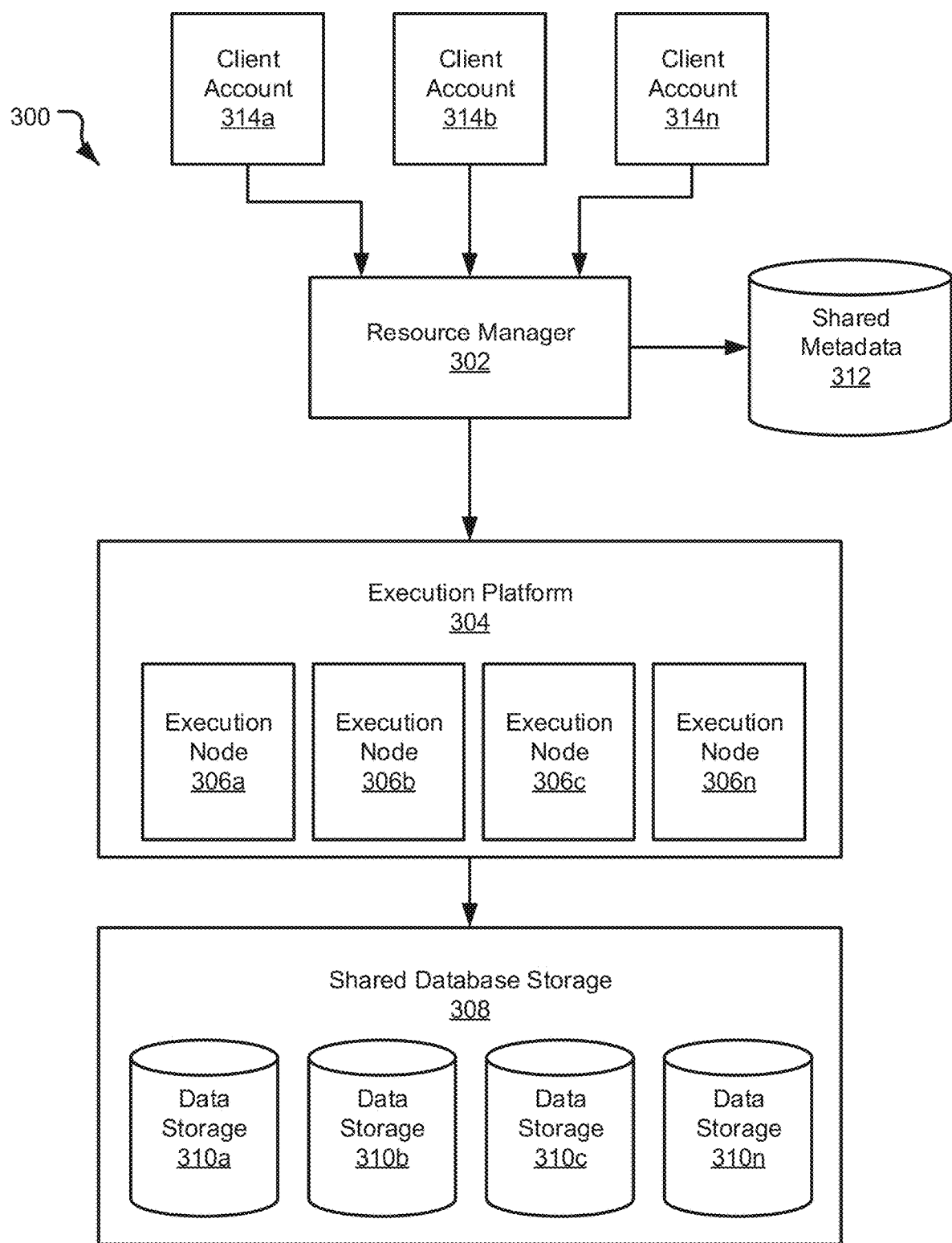
FIG. 3 is a schematic diagram of a data processing platform, according to one embodiment.

Referring now to FIG. 3, a data processing platform 300 is illustrated for running the methods and systems disclosed herein. As shown in FIG. 3, resource manager 302 may be coupled to multiple client accounts 314*a*, 314*b*, and 314*n*. The client accounts 314*a*, 314*b*, and 314*n* may represent different clients such as the client 118 illustrated in FIG. 1. In particular implementations, the resource manager 302 can support any number of client accounts desiring access to the execution platform 304 and/or shared database storage 308. Client accounts 314*a*, 314*b*, and 314*n* may include, for example, end users providing user files to be ingested into the database, data storage and retrieval requests, system administrators managing the systems and methods described herein, and other components/devices that interact with resource manager 302.

The resource manager 302 provides various services and functions that support the operation of all systems and components within the data processing platform 300. The resource manager 302 may be coupled to shared metadata 312, which is associated with the entirety of data stored throughout data processing platform 300. The shared metadata 312 includes metadata for data stored in the shared database storage 308 and further includes metadata for data stored in external tables (see 106). In some embodiments, shared metadata 312 includes a summary of data stored in remote data storage systems as well as data available from a local cache. Additionally, shared metadata 312 may include information regarding how data is organized in the remote data storage systems and the local caches. Shared metadata 312 may allow systems and services to determine whether a piece of data needs to be processed without loading or accessing the actual data from a storage device. The shared metadata 312 may be organized according to the metadata structures illustrated in FIG. 10 and FIGS. 11A-11C.

The resource manager 302 may be further coupled to the execution platform 304, which provides multiple computing resources that execute various data storage and data retrieval tasks, as discussed in greater detail below. The execution platform 304 includes a plurality of execution nodes 306*a*, 306*b*, 306*c*, and 306*n* configured to process various tasks associated with the database, including ingesting new user files and generating one or more partitions for a table (may be an external table or a table stored in the shared database storage 308) based on the new user files. The execution platform 304 may be coupled to the shared database storage 308 including multiple data storage devices 310a, 310b, 310c, and 310n. In some embodiments, the shared database storage 308 includes cloud-based storage devices located in one or more geographic locations. For example, the shared database storage 308 may be part of a public cloud infrastructure or a private cloud infrastructure. The shared database storage 308 may include hard disk drives (HDDs), solid state drives (SSDs), storage clusters or any other data storage technology. Additionally, shared database storage 308 may include distributed file systems (such as Hadoop Distributed File Systems (HDFS)), object storage systems, and the like. It should be appreciated that the shared database storage 308 may be accessible by one or more instances of the resource manager 302 but may not be accessible by all client accounts 314a-314n. In an embodiment, a single instance of the resource manager 302 is shared by a plurality of client accounts 314a-314n. In an embodiment, each client account 314a-314n has its own resource manager and/or its own shared database storage 308 that is shared amongst a plurality of execution nodes 306a-306n of the execution platform 304. In an embodiment, the resource manager 302 is responsible for providing a particular client account 314a-314n access to particular data within the shared database storage 308.

In particular embodiments, the communication links between the resource manager 302 and client accounts 314a-314n, shared metadata 312, and execution platform 304 are implemented via one or more data communication networks. Similarly, the communication links between execution platform 304 and shared database storage 308 are implemented via one or more data communication networks. These data communication networks may utilize any communication protocol and any type of communication medium. In some embodiments, the data communication networks are a combination of two or more data communication networks (or sub-networks) coupled to one another. In alternative embodiments, these communication links are implemented using any type of communication medium and any communication protocol.

As shown in FIG. 3, data storage devices 310a-310n are decoupled from the computing resources associated with execution platform 304. This architecture supports dynamic changes to data processing platform 300 based on the changing data storage/retrieval needs as well as the changing needs of the users and systems accessing data processing platform 300. This architecture enables the execution platform 304 and the shared database storage 308 to be effectively infinitely scalable. The support of dynamic changes allows the data processing platform 300 to scale quickly in response to changing demands on the systems and components within data processing platform 300. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The resource manager 302, shared metadata 312, execution platform 304, and shared database storage 308 are shown in FIG. 3 as individual components. However, each of the resource manager 302, the shared metadata 312, the execution platform 304, and the shared database storage 308 may be implemented as a distributed system (e.g., distributed across multiple systems/platforms at multiple geographic locations). Additionally, each of resource manager 302, shared metadata 312, execution platform 304, and shared database storage 308 can be scaled up or down (independently of one another) depending on changes to the requests received from client accounts 314a-314n and the changing needs of data processing platform 300. Thus, data processing platform 300 is dynamic and supports regular changes to meet the current data processing needs.

Figure 4:
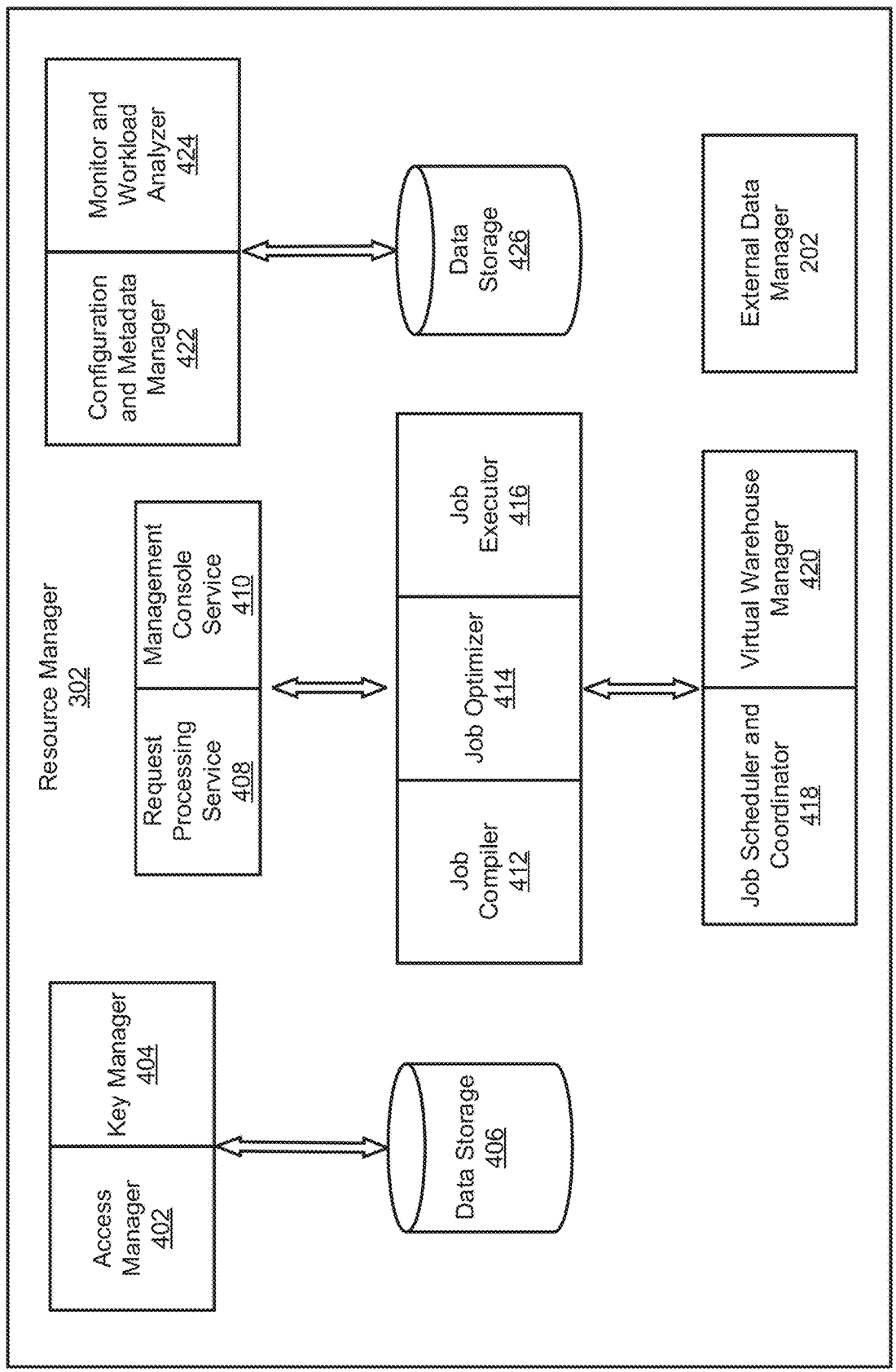
FIG. 4 is a block diagram of a resource manager, according to one embodiment.

FIG. 4 is a block diagram depicting an embodiment of resource manager 302. As shown in FIG. 4, resource manager 302 includes an access manager 402 and a key manager 404 coupled to a data storage device 406. Access manager 402 may handle authentication and authorization tasks for the systems described herein. Key manager 404 may manage storage and authentication of keys used during authentication and authorization tasks. A request processing service 408 manages received data storage requests and data retrieval requests. A management console service 410 supports access to various systems and processes by administrators and other system managers.

The resource manager 302 may also include a job compiler 412, a job optimizer 414 and a job executor 416. Job compiler 412 parses tasks, such as ingest tasks, and generates the execution code for the ingestion of user files. Job optimizer 414 determines the best method to execute ingest tasks based on the data that needs to be processed and/or ingested. Job executor 416 executes code for ingest tasks received by resource manager 302. A job scheduler and coordinator 418 may send received user files to the appropriate services or systems for compilation, optimization, and dispatch to the execution platform 304. A virtual warehouse manager 420 manages the operation of multiple virtual warehouses implemented in an execution platform.

Additionally, the resource manager 302 includes a configuration and metadata manager 422, which manages the information related to the data stored in the remote data storage devices and in the local caches. A monitor and workload analyzer 424 oversees the processes performed by resource manager 302 and manages the distribution of tasks (e.g., workload) across the virtual warehouses and execution nodes in the execution platform. Configuration and metadata manager 422 and monitor and workload analyzer 424 are coupled to a data storage device 426.

The resource manager 302 includes an database platform 102 as described in FIG. 2. The database platform 102 manages the interaction between the database platform 102 and an external table 106. The external table may include data stored in a source table of a data lake 104.

Figure 5:
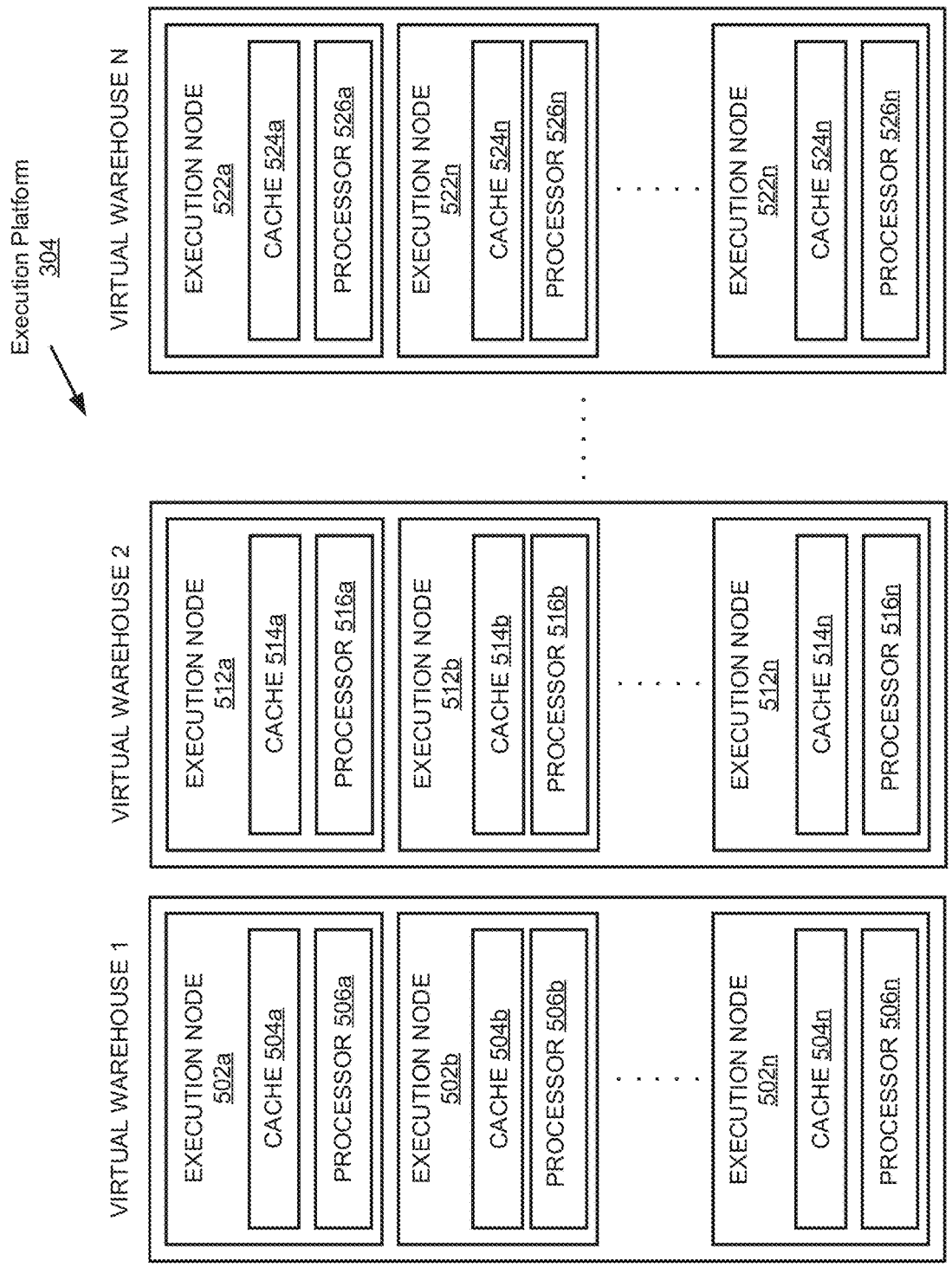
FIG. 5 is a block diagram of an execution platform, according to one embodiment.

FIG. 5 is a block diagram depicting an embodiment of an execution platform 304. As shown in FIG. 5, execution platform 304 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, execution platform 304 can add new virtual warehouses and drop existing virtual warehouses in real-time based on the current processing needs of the systems and users. This flexibility allows the execution platform 304 to quickly deploy large amounts of computing resources when needed without being forced to continue paying for those computing resources when they are no longer needed. All virtual warehouses can access data from any data storage device (e.g., any storage device in shared database storage 308). Although each virtual warehouse shown in FIG. 5 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 310*a*-310*n* shown in FIG. 3. Thus, the virtual warehouses are not necessarily assigned to a specific data storage device and, instead, can access data from any of the data storage devices 310*a*-310*n* within the shared database storage 308. Similarly, each of the execution nodes shown in FIG. 5 can access data from any of the data storage devices 310*a*-310*n*. In some embodiments, a particular virtual warehouse or a particular execution node may be temporarily assigned to a specific data storage device, but the virtual warehouse or execution node may later access data from any other data storage device.

In the example of FIG. 5, virtual warehouse 1 includes three execution nodes 502*a*, 502*b*, and 502*n*. Execution node 502*a* includes a cache 504*b* and a processor 506*a*. Execution node 502*b* includes a cache 504*b* and a processor 506*b*. Execution node 502*n* includes a cache 504*n* and a processor 506*n*. Each execution node 502*a*, 502*b*, and 502*n* is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 512*a*, 512*b*, and 512*n*. Execution node 512*a* includes a cache 514*a* and a processor 516*a*. Execution node 512*b* includes a cache 514*b* and a processor 516*b*. Execution node 512*n* includes a cache 514*n* and a processor 516*n*. Additionally, virtual warehouse 3 includes three execution nodes 522*a*, 522*b*, and 522*n*. Execution node 522*a* includes a cache 524*a* and a processor 526*a*. Execution node 522*b* includes a cache 524*b* and a processor 526*b*. Execution node 522*n* includes a cache 524*n* and a processor 526*n*.

In some embodiments, the execution nodes shown in FIG. 5 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 5 each include one data cache and one processor, alternative embodiments may include execution nodes containing any number of processors and any number of caches. Additionally, the caches may vary in size among the different execution nodes. The caches shown in FIG. 5 store, in the local execution node, data that was retrieved from one or more data storage devices in the shared database storage 308. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the shared database storage 308.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 304, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 5 as having multiple execution nodes. The multiple execution nodes associated with each virtual warehouse may be implemented using multiple computing systems at multiple geographic locations. For example, an instance of virtual warehouse 1 implements execution nodes 502*a* and 502*b* on one computing platform at a geographic location and implements execution node 502*n* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 304 is also fault tolerant. For example, if one virtual warehouse fails, that virtual warehouse is quickly replaced with a different virtual warehouse at a different geographic location.

A particular execution platform 304 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the shared database storage 308 but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

The execution platform 304 may execute queries against an external table, where the external table is not managed by the database platform but can be read by the database platform. The execution platform 302 may execute such queries by communicating with the external table and reading data directly from the external table.

Figure 6:
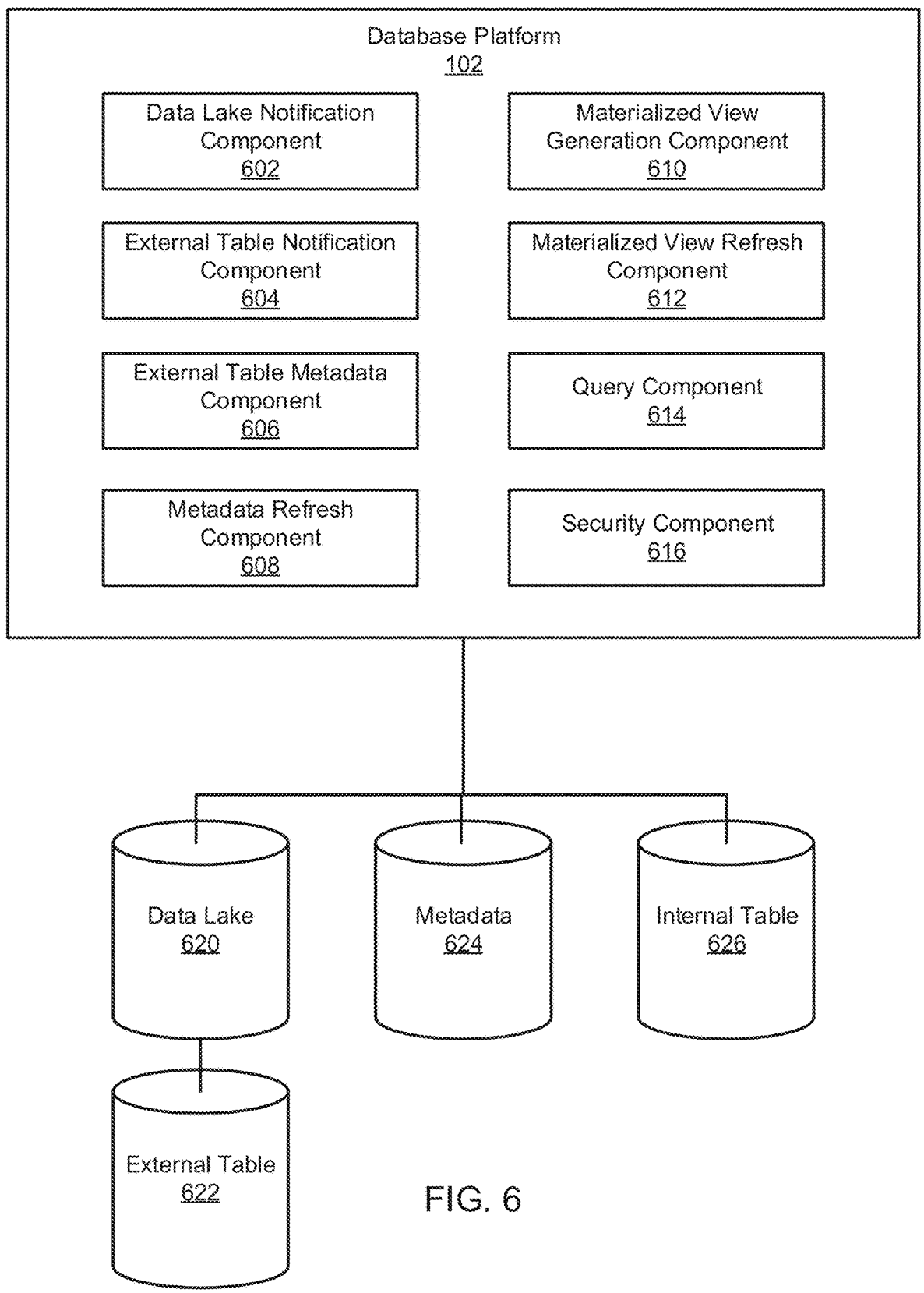
FIG. 6 is a block diagram of an external data manager, according to one embodiment.

FIG. 6 is a schematic block diagram of an database platform 102. The database platform 102 includes a data lake notification component 602, an external table notification component 604, an external table metadata component 606, a metadata refresh component 608, a materialized view generation component 610, a materialized view refresh component 612, a query component 614, and a security component 616. The database platform 102 may be in communication with a data lake 620 that may include an external table 622. The database platform 102 may further be in communication with one or more "internal" tables 626 that are managed by a database platform 102. The database platform 102 is in communication with and can read and write to metadata 624 that includes information about one or more of the data in the data lake 620, the external table 622, and/or the internal table 626.

The data lake notification component 602 receives a notification that data has been added, deleted, or modified in a data lake 620. The data lake notification component 602 may alternatively be referred to as a data lake notification listener component. The data lake notification component 602 may proactively query the data lake 620 to determine if any data has been added, deleted, or modified since the last time the database platform read data in the data lake. The data lake notification component 602 may receive a notification from the data lake 620 that is automatically or manually generated by the data lake provider or the client.

In an embodiment, the data lake notification component 602 is configured to detect an update to the source directory within the data lake 620, wherein the external table 622 is based on the source directory. In an embodiment, the data lake notification component 602 receives an indication that a file has been added, modified, or removed from the source directory. In an embodiment, the data lake notification component 602 is in communication with a simple queue service ("SQS") message. This communication may be set up by the client or a system administrator when the external table 622 is generated. The SQS queue id (ARN) may be supplied to the data lake 620 back such that push notifications will be generated via SQS each time a file is added, updated, or deleted from the data lake 620. In an embodiment, the data lake notification component 602 receives a SQL command to register and deregister a file in an external table 622. The SQL command may be received from a client and may indicate that metadata should be refreshed based on the current state of the external table 622 location.

The external table notification component 604 receives a notification that data has been added, deleted, or modified in an external table 622. The external table notification component 604 may alternatively be referred to as an external table notification listener component. The external table notification component 604 may proactively query the external table 622 to determine if any data has been added, deleted, or modified since the last time the database platform read data in the external table 622. The external table notification component 602 may receive a notification from the external table 622 or the data lake 620 that is automatically or manually generated by the data lake provider (i.e., also the external table provider) or the client. The external table 622 may constitute a source table that is stored within the data lake 620. The source table may be defined by the client and the client may add, delete, or modify data stored in the source table. The client may create an external table 622 with the database platform by granting the database platform read permissions to the source table within the data lake 620.

The external table metadata component 606 generates, manages, and refreshes metadata 624 that includes information about data stored in the external table 622. The metadata 624 may be stored according to the metadata structures disclosed in FIG. 10 and FIGS. 11A-11C. The external table metadata component 606 may read the data stored in the external table 622 to determine the metadata 624. The external table metadata component 606 may determine the metadata 624 based on how data is organized within the external table 622. The client may organize data in the external table 622 according to a hierarchical structure, and the details of the hierarchical structure may be provided to the database platform. The hierarchical structure of organization for the external table 622 includes an indication of how folders and subfolders of data in the external table 622 are organized. In an example, a hierarchical structure may indicate that one folder includes all transactions for a certain year and that subfolders within that folder include all transactions for each month of that year. The data in the external table 622 may be partitioned into partitions according to some other parameter such as location or name. The client uploads files to a specific folder in the external table 622, and the location of the file (i.e., which folder the file is uploaded to) guides the external table metadata component 606 in generating the metadata 624 about the external table 622.

The metadata refresh component 608 refreshes the metadata 624 about the external table 622 in response to changes that are made to the external table 622. The metadata 624 for the external table 622 is refreshed when data is added, deleted, or updated in the external table 622.

The materialized view generation component 610 generates one or more materialized views over the external table 622. The materialized view generation component 610 may generate a materialized view based on a query received from the client. The client may manually request that a materialized view be generated for a certain dataset in the external table 622. The database platform may automatically determine that a materialized view should be generated for a certain dataset in the external table 622 if that dataset applies to a query that is frequently requested by the client. The materialized view is stored with the database platform 102 and may be stored in cache storage or in the shared database storage 308. The materialized view may be stored in cache storage associated with a node of the execution platform 304.

The materialized view generation component 610 generates the materialized view based on the external table 622. The materialized view generation component 610 may generate the materialized view to have its own domain and have the characteristics of both a table and a view with additional information linked to the external table 622 and versioning information related to the external table 622 and/or the source directory within the data lake 620. The materialized view is a declarative specification of a persistent query result that is automatically maintained and transparently utilized. The materialized view is a database object that includes the results of a persistent query result on the external table 622 and/or the source directory within the data lake 620. The materialized view may be a local copy of data located remotely, it may be a subset of rows and/or columns of the source directory or join result, or it may be a summary using an aggregate function. The materialized view generation component 610 may be configured to generate the materialized view by caching the results of a query by the process of materialization such that the cached query result is stored as a concrete "materialized" table that may be updated from the original external table 622 and/or source directory within the data lake 620. The materialized view may provide improved performance of database queries on large select, join, or aggregate statements. The materialized view provides additional storage that is small compared to the source directory, the materialized view may be automatically maintained, and the materialized view may be transparently used without changing an existing workload on the external table 622 and/or the source directory within the data lake 620. The materialized view includes additional information linked to its management, including a source directory identifier, a set of partitions materialized since the last refresh version of the materialized view, and a set of partitions removed since a last compact version of the materialized view.

In an embodiment, the materialized view generation component 610 stores within the materialized view the same information as for tables e.g. stage information and for views e.g. view definitions. Additionally, the materialized view generation component 610 stores a source directory identifier. The source directory identifier is tagged to the materialized view during compilation to indicate the source directory that will be utilized for maintenance and incremental updating of the materialized view. The materialized view generation component 610 further stores an indication of a type of materialized view, wherein the type of materialized view indicates an enumerated type that is utilized to determine the scope of a materialized view (e.g. projection, summary, synopses, join, etc.). In addition, the materialized view generation component 610 may include information specific to DML versioning that is added to the table version associated with the materialized view. The materialized view may be tagged with a time of a prior refresh and a time of a prior compaction of the materialized view.

The materialized view refresh component 612 refreshes a materialized view that is generated over an external table. The materialized view refresh component 612 may further refresh materialized views that are generated over internals table 626 that are managed by the database platform 102. The materialized view refresh component 612 refreshes a materialized view over an external table when data is added, deleted, or updated in the external table. The materialized view may be refreshed after a threshold number of modifications have been made to the external table, after a threshold time duration has passed since the last refresh, after each update to the external table, or based on any suitable metric. In an embodiment, the client may define when and how often the materialized view is refreshed and/or may define parameters for an acceptable amount of inconsistency or staleness between the external table and the materialized view.

The materialized view refresh component 612 may maintain a refresh construct that indicates the set of partitions to insert into the materialized view by pulling the log of added partitions that have been added to the source directory of the data lake 620 since the last refresh of the materialized view. The materialized view refresh component 612 maintains a compact construct that indicates the set of partitions to remove from the materialized view by pulling the log of partitions that have been removed from the source directory since the last compaction of the materialized view.

The materialized view refresh component 612 is configured to perform a refresh on the materialized view by adding one or more partitions or new rows to the materialized view. The materialized view refresh component 612 receives an indication from the data lake notification component 602 and/or the external table notification component 604 that a partition has been inserted into the source directory of the data lake 620 since the last refresh of the materialized view. The materialized view refresh component 612 then inserts that partition into the materialized view. The materialized view refresh component 612 may receive a single source directory identifier for each materialized view that it generates. In an embodiment, the materialized view refresh component 612 is manually triggered, enabled, or disabled by an account issuing a command. In an embodiment, the materialized view refresh component 612 automatically updates the materialized view when the materialized view refresh component 612 is enabled.

In an embodiment, the materialized view refresh component 612 carries out an insert command. The materialized view refresh component 612 receives a log of new partitions that have been added to the source directory of the data lake 620 since a prior refresh of the external table and/or the materialized view. The materialized view refresh component 612 inserts the new partitions into the materialized view and may be configured to group the new partitions in a column of the materialized view and order the new partitions in the materialized view. In an embodiment, the metadata for the new partition is consistent between the source directory of the data lake 620 and the external table 622.

The query component 614 determines a query plan to execute queries over an external table. The resource manager 302 may receive a query from a client. The query may include a Structured Query Language (SQL) query having certain parameters. The query component 614 reads the shared metadata 312 to determine where the applicable files for responding to the query are stored. The applicable files may be stored in "internal" data stored in the shared database storage 308 managed by the database platform 102, may be stored in cache storage in the execution platform 304, may be stored in the external table 106, may be stored in materialized views, or may be stored in any combination of the above. The query component 614 determines the files that are necessary to respond to the query and further determines where those files are located across the shared database storage 308, cache storage in the execution platform 304, the external table 106, and/or materialized views. The query component 614 generates a query plan that includes one or more discrete subtasks to be executed to respond to the query. The query component 614 assigns the one or more discrete subtasks to different nodes of the execution platform 304 for processing. The query component 614 assigns the one or more discrete subtasks based on where the files are stored. For example, if a certain execution node has cached a materialized view that includes data necessary to respond to the query, that execution node will be assigned a subtask pertaining to that data. Further for example, if a certain execution node has cached a portion of the external table or the "internal" data managed by the database platform, that execution node will be assigned a subtask pertaining to the data. The query is executed by the execution platform and may be returned to the client by the resource manager 302.

The security component 616 manages permissions for the data lake 620, the external table 106, the database platform 102, the shared database storage 308, and/or materialized views. The security component 616 carries out one or more security protocols to protect data in any of the source directory of the data lake 620, the external table 622, the metadata 624, the internal table 626, and/or the materialized view. In an embodiment, the security component 616 provides an account setting to an account associated with the source directory such that the account may request an external table and/or a materialized view to be generated based on the source directory. As such, the security component 616 may further provide an account setting to a second account associated with the source directory such that the second account does not have permission to request an external table or a materialized view. In an embodiment, the security component 616 encrypts data in the source directory, the external table, or the materialized view. In an embodiment, the security component 616 rekeys or re-encrypts data in the source directory, the external table, or the materialized view at predetermined time periods, upon client request, and/or when data is updated.

In an embodiment, the work performed by the database platform 102 is performed in the background and may occur in a continuous fashion. In an embodiment, as soon as a materialized view is generated based on an external table 622, the database platform 102 is configured to maintain freshness of the materialized view. In an embodiment, a maximum budget for materialized view maintenance may be altered by a client. The client may provide a significant budget for maintenance operations of certain materialized views but provide a smaller budget for other materialized views. The client may have access to a plurality of priority settings for maintenance operations of various materialized views. The client may further receive information indicating how frequently and how efficiently a materialized view is refreshed or compacted.

Figure 7:
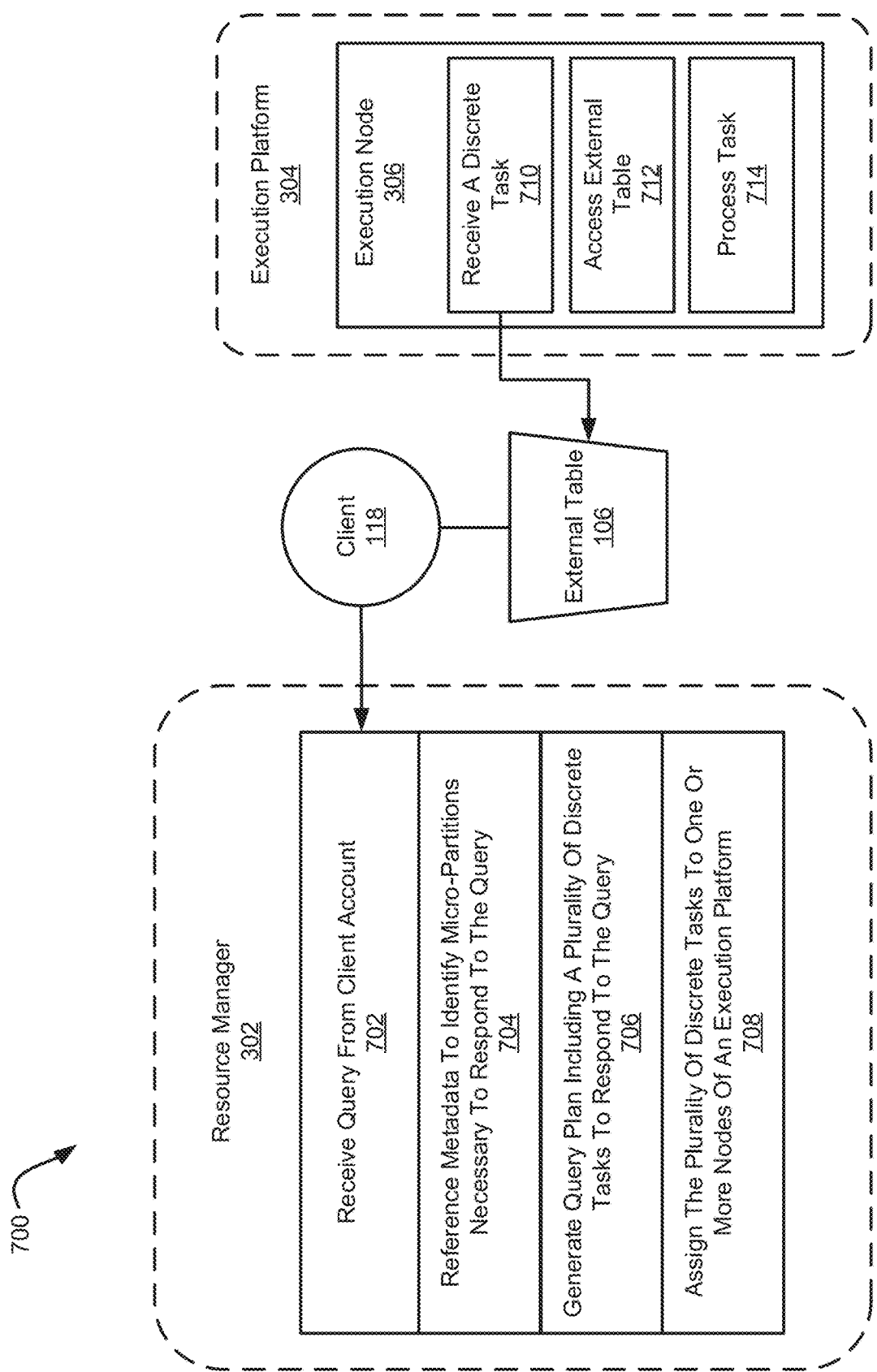
FIG. 7 is a block diagram of a process flow for querying over an external table, according to one embodiment.

FIG. 7 is a schematic block diagram of an example process flow 700 for querying over an external table. The process flow 700 may be carried out by a resource manager 302 and an execution platform 304 as described herein. The client 118 may include an account associated with the resource manager 302 (i.e., associated with the database platform 102) and further associated with a data lake 104 that stores the data for the external table 106. The client 118 provides a query to the resource manager 302. The query may include a Structured Query Language (SQL) statement. The resource manager 302 receives the query from the client account at 702 and the query includes one or more query predicates. The resource manager 302 references metadata to identify the partitions that are necessary to respond to the query at 704 by determining which partitions within the external table and/or the shared database storage 308 include data that satisfies the one or more query predicates. The resource manager 302 generates a query plan that includes a plurality of discrete subtasks that need to be processed to respond to the query at 706. The resource manager 302 assigns the plurality of discrete subtasks to one or more nodes of an execution platform at 708.

The resource manager 302 may assign the plurality of discrete subtasks based on metadata and further based on where the identified partitions are stored. For example, the resource manager 302 may reference metadata to learn that a first identified partition is stored in cache storage of a first execution node. The resource manager 302 may then assign the first identified partition to the first execution node to hasten query response time and lessen the processing load to avoid retrieving the partition from an external table or the shared database storage 308. Further for example, the resource manager 302 may determine that one identified partition is referenced in a materialized view. The resource manager 302 may assign an execution node to read the materialized view to execute one of the discrete subtasks of the query plan.

In the process flow 700, an example execution node 306 of the execution platform 304 has access to the external table 106. The execution node 306 receives an instruction from the resource manager 302 to execute a discrete subtask of the query plan at 710, where the discrete subtask requires the execution node 306 to read data in the external table 106. The execution node 306 access the external table at 712 to read one or more partitions in the external table that are specified in the discrete subtask. The execution node 306 process the task at 714 by reading one or more partitions in the external table and filtering rows that do not satisfy the query predicates to return only those rows that satisfy the query predicates.

In an embodiment, referencing metadata at 704 to identify partitions necessary to respond to the query includes referencing shared metadata 312 to identifying partitions in the external table and further to identify partitions in internal database storage (such as cache storage and/or data in the shared database storage 308) that are necessary to respond to the query. Referencing the metadata at 704 may further include determining whether a materialized view has been generated over any data in the external table or an internal table. In the event the external table and/or the internal table has been modified since a most recent refresh of the corresponding materialized view, the query plan may include supplementing the materialized view with data in the external table or the internal table. This may be accomplished by reading metadata for the materialized view to determine a timestamp when the materialized view was refreshed, and further by reading metadata for the corresponding external table and/or internal table to determine timestamps when recent modifications were made to the external table and/or the internal table. The timestamps may be compared to determining how many modifications and which modifications were made to the external table and/or the internal table since the most recent refresh of the corresponding materialized view. Supplementing the materialized view may further be accomplished by reading metadata to determine what modifications were made at certain timestamps. The timestamps may include information about what modifications were made, for example what Data Manipulation Language (DML) commands were executed, such as update, delete, and/or merge commands. The materialized view may be supplemented based on this metadata to determine which rows in the materialized view are stale with respect to the external table and/or the internal table. Those rows that are determined to be stale will not be read from the materialized view but will instead be read from the internal table and/or the external table.

Figure 8:
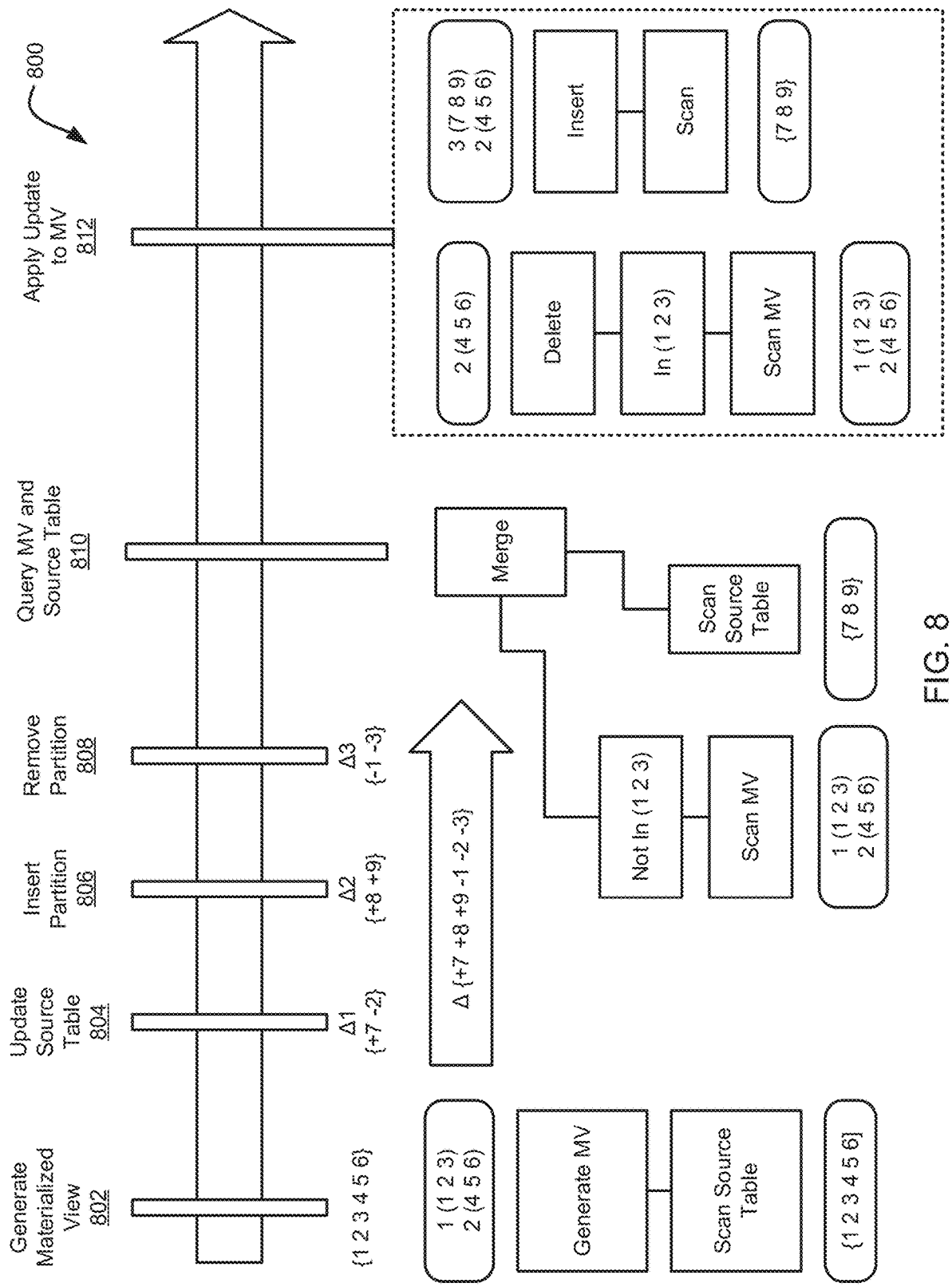
FIG. 8 is a block diagram of a process flow for incremental updating of a materialized view, according to one embodiment.

FIG. 8 illustrates a schematic block diagram of an example process flow 800 for incremental updating of a materialized view. The process flow 800 may be carried out by any suitable computing device, including for example a resource manager 302 and/or an database platform 102 and specifically a materialized view generation component 610 and/or a materialized view refresh component 612. The process flow 800 includes generating a materialized view at 802 that is based on a source table (in an embodiment as disclosed herein, the source table may be an external table that is based on a data lake source directory, for example). The process flow 800 includes updating the source table at 804 which may include inserting a partition at 806 and/or removing a partition at 808. The process flow includes querying the materialized view and the source table at 810 to detect any updates to the source table that are not reflected in the materialized view. The process flow 800 includes applying the update to the materialized view at 812.

In the example illustrated in FIG. 8, the materialized view is generated at 802 by scanning a source table. The source table includes the dataset {1 2 3 4 5 6} as illustrated. The corresponding materialized view includes the data sets [1(1 2 3)] and [2(4 5 6)] that may indicate partitions in the database, where the partitions are immutable storage objects in the database.

In the example illustrated in FIG. 8, the source table is updated at 804 (see Δ1) by adding (+7) and removing (−2). Two partitions are inserted into the source table at 806 (see Δ2) by adding (+8) and adding (+9). Two partitions are removed from the source table at 808 (see Δ3) by removing (−1) and (−3). As illustrated in A (delta), the overall update to the source table includes {+7 +8 +9 −1 −2 −3}, which includes each of the various updates (see Δ1, Δ2, and Δ3) that are made on the source table.

In the example illustrated in FIG. 8, the materialized view and the source table are queried at 810. The query 810 includes merging the materialized view and the source table. The source table is scanned and partitions (7 8 9) are detected in the source table and those partitions are not detected in the materialized view. The materialized view is scanned and the partition (1 2 3) is detected in the materialized view and it is not detected in the source table.

In the example illustrated in FIG. 8, the update is applied to the materialized view at 812. The materialized view is scanned, and the system detects the partitions [1(1 2 3)] and [2(4 5 6)], and the system detects that partition [1(1 2 3)] is present in the materialized view and should be removed. The system deletes the partition [1(1 2 3)] such that the partition [2(4 5 6)] remains. The system scans the source table and discovers the partition {7 8 9} and inserts that partition into the materialized view such that the materialized view includes the partitions [2(4 5 6)] and [3(7 8 9)].

Figure 9:
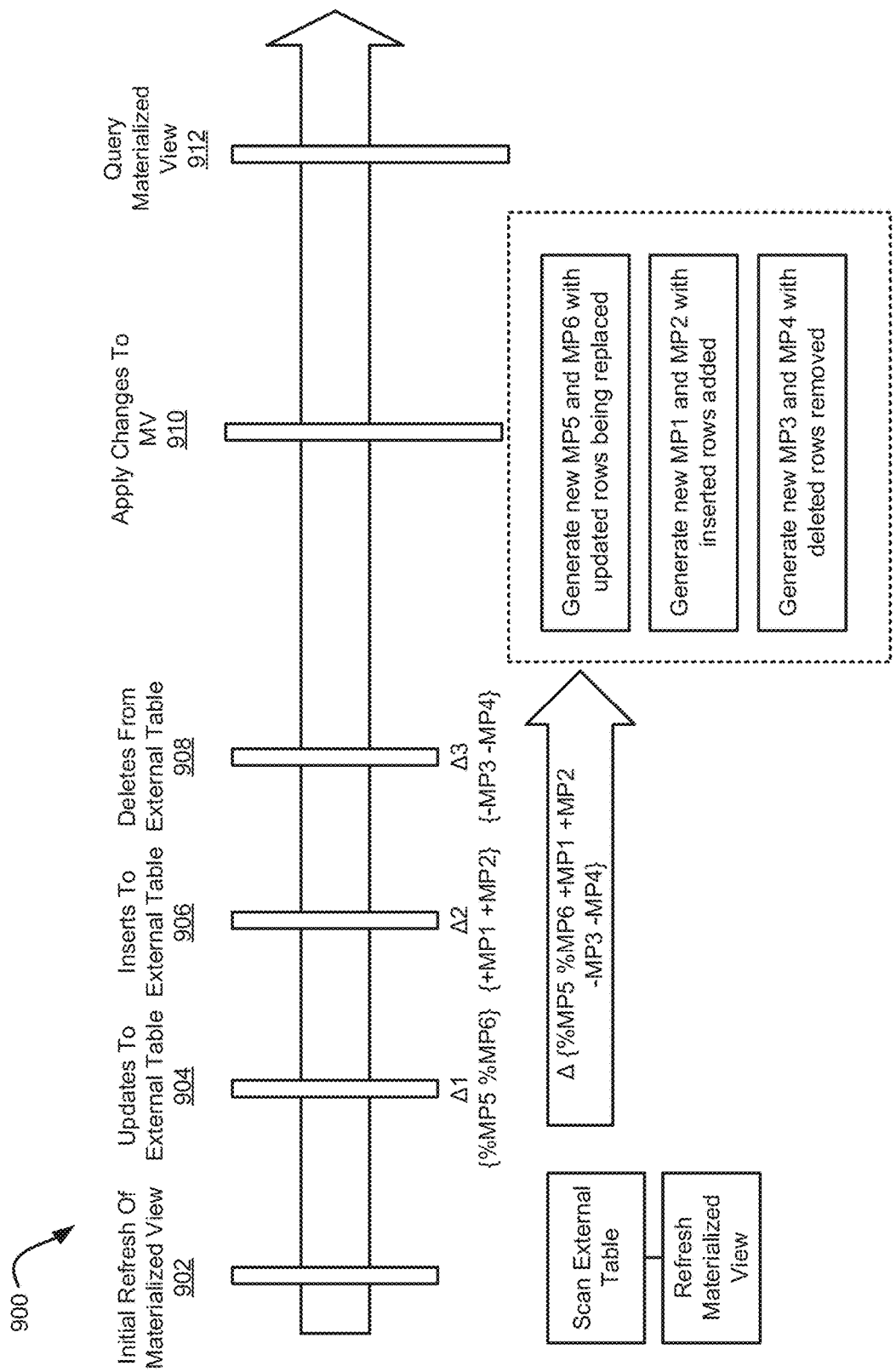
FIG. 9 is a block diagram of a process flow for updating a materialized view over an external table, according to one embodiment.

FIG. 9 illustrates a schematic block diagram of an example process flow 900 for updating of a materialized view over an external table. The process flow 900 may be carried out by any suitable computing device, including for example a resource manager 302 and/or an database platform 102 and specifically a materialized view generation component 610 and/or a materialized view refresh component 612 of the database platform 102. The materialized view is generated over an external table such that the materialized view is generated, refreshed, and stored with a database platform 102 and the source table for the materialized view (i.e., the external table 106) is not managed, stored, or updated by the database platform. The materialized view is internal to the database platform 102 and the source table is external to the database platform 102. The materialized view may be stored in persistent storage such as the shared database storage 308 or it may be stored in cache storage, such as cache storage within an execution node 306 of the execution platform 304. The source table for the materialized view (i.e. the external table) may be stored in persistent storage in a data lake.

The process flow 900 includes an initial refresh of the materialized view at 902. The initial refresh at 902 includes scanning the external table (the source table for the materialized view) and refreshing the materialized view. The process flow 900 includes updates being made to the external table at 904. The updates may be initiated by a client that is in communication with a data lake that supports the external table, and the updates may be implemented by a provider of the data lake. In the example in FIG. 9, the updates are made to micro-partition 5 (MP5) and micro-partition 6 (MP6). The updates may include modifying an entry in one or more rows of MP5 and MP6.

The process flow 900 includes inserts being made to the external table at 906. The inserts may be initiated by a client that is in communication with a data lake that supports the external table, and the inserts may be implemented by a provider of the data lake. In the example in FIG. 9, the inserts performed at 906 are executed on micro-partition 1 (MP1) and micro-partition 2 (MP2). The inserts may include one or more rows being added to MP1 or MP2. The inserts may include adding MP1 or MP2 if one or more of those partitions did not previously exist.

The process flow 900 includes deletes being executed on the external table at 908. The deletes may be initiated by a client that is in communication with a data lake that supports the external table, and deletes may be implemented by a provider of the data lake. In the example in FIG. 9, the deletes performed at 908 are executed on micro-partition 3 (MP3) and micro-partition 4 (MP4). The deletes may include one or more rows being removed from MP3 and/or MP4. The deletes may include MP3 and/or MP4 being removed entirely.

The process flow 900 includes applying changes made to the external table (i.e. the source table for the materialized view) to the materialized view at 910. Applying the changes at 910 includes generating a new MP5 and a new MP6 having the updated rows according to the updates that were made to the external table at 904. Applying the updates includes removing and replacing the modified rows. Applying the changes at 910 includes generating a new MP1 and a new MP2 having inserted rows according to the inserts that were made to the external table at 906. Applying the changes at 910 includes generating a new MP3 and a new MP4 with the deleted rows being removed according to the deletes that were made to the external table at 908. The process flow 900 includes querying the materialized view at 912. Because the materialized view has been refreshed to reflect updates made to the external table, queries may be executed over the materialized view rather than the external table itself to hasten query response times.

Figure 10:
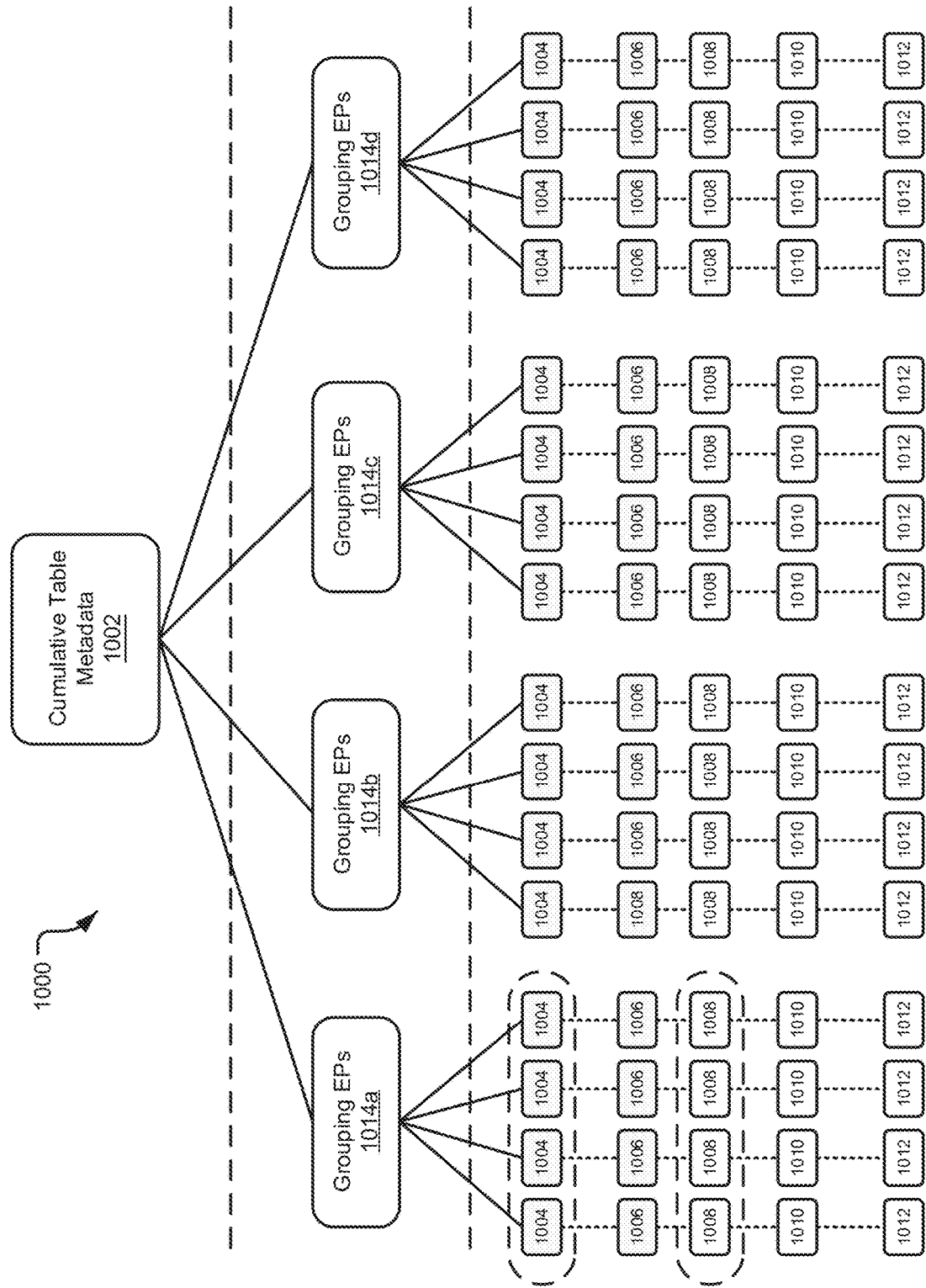
FIG. 10 is a schematic diagram of a data structure for storage of data and metadata in a database system, according to one embodiment.

FIG. 10 is a schematic diagram of a data structure 1000 for storage of database metadata, including in persistent storage and cache storage. The data structure 1000 may be applied to the storage of metadata for external tables that are not managed by a database platform 102 and/or for internal tables that are managed and stored by the database platform 102. The data structure 1000 includes cumulative table metadata 1002 including information about a table. The table may be an external table or an internal table. The table may include a plurality of files or partitions that may each include a number of columns and rows storing data. The cumulative table metadata 1002 includes global information about the table and may include summary information stored in each of a plurality of grouping expression properties 1014a, 1014b, 1014c, and 1014d (may be collectively referenced herein as "1014"). The grouping expression properties 1014 include aggregated partition statistics, cumulative column properties, and so forth about a partition 1006 or a collection of partitions of the table. It should be appreciated that the partitions 1006 illustrated in FIG. 10 may each contain a different subset of the data stored in the table and may include the same columns or may include different columns storing different types of information. The partitions 1006 of the table each include one or more columns and may each have the same types of columns or different types of columns. An expression property may be stored for each column of each partition 1006 of the table, or for a collection of partitions 1006 of the table as illustrated in FIG. 10. The data structure 1000 includes partition statistics 1004 for each partition 1006 of the table (the partition statistics 1004 may alternatively be referred to herein as "partition expression properties"). The partition statistics 1004 may include a minimum/maximum data point for the corresponding partition 1006, a type of data stored in the corresponding partition 1006, a partition structure of the corresponding partition 1006, and so forth. As illustrated in FIG. 10, a column 1 expression property 1008 is stored for the first column in each of the different partitions 1006. Further, a column 2 expression property 1010 is stored for the second column in each of the different partitions 1006. Further, a column 3 expression property 1012 is stored for the third column in each of the different partitions. It should be appreciated that each of the partitions 1006 may include any suitable number of columns, and that an expression property may be stored for each of the columns, or for any suitable number of the columns, stored in each partition of the table. The column 1 expression properties 1008, the column 2 expression properties 1010, and the column 3 expression properties 1012, along with any additional column expression properties that may be included as deemed appropriate, may be stored as part of a metadata partition. A metadata partition may be persisted in immutable storage and the grouping expression properties 1014 may also be stored within a metadata partition in immutable storage. A metadata manager may maintain all metadata partitions, including metadata partitions comprising the grouping expression properties 1014, and partition statistics 1004, and/or the column expression properties 1008-1012.

The cumulative table metadata 1002 includes global information about all partitions within the applicable table. For example, the cumulative table metadata 1002 may include a global minimum and global maximum for the entire table, which may include millions or even hundreds of millions of partitions. The cumulative table metadata 1002 may include any suitable information about the data stored in the table, including, for example, minimum/maximum values, null count, a summary of the database data collectively stored across the table, a type of data stored across the table, a distinct for the data stored in the table, and so forth.

The grouping expression properties 1014a-1014d include information about database data stored in an associated grouping of partitions. For example, an example grouping expression property is associated with partitions numbered 3040 thru 3090 such that the example grouping expression property is associated with fifty different partitions. The example grouping expression property includes information about those fifty different partitions. A grouping expression property 1014 may include any suitable information about the partitions with which it is associated. For example, a grouping expression property 1014 may include a global minimum/maximum for the collective set of partitions, a minimum/maximum for each of the partitions within the grouping, a global null count, a null count for each of the partitions within the grouping, a global summary of data collectively stored across the grouping of partitions, a summary of data stored in each of the partitions in the grouping, and so forth. The grouping expression property 1014 may include global information for all partitions within the grouping of partitions that is associated with the grouping expression property 1014, and it may further include information specific to each of the partitions within the associated grouping.

The metadata structure disclosed in FIG. 10 provides increased granularity in cumulative table metadata 1002 over other embodiments of database metadata structures. The grouping expression properties 1014 provide valuable global metadata pertaining to a collection of partitions 1006 of the database. Further, each of the columnar expression properties 1008, 1010, 1012 provide valuable information about a column of a partition 1006 of the table.

The metadata structures disclosed herein, including the data structure 1000 shown in FIG. 10, increases efficiency when responding to database queries. A database query may request any collection of data from the database and/or an external table and may be used for creating advanced analyses and metrics about the database data and/or the data stored in an external table. Some queries, particularly for a very large database, external table, and/or data lake, can be extremely costly to run both in time and computing resources. When it is necessary to scan metadata and/or database data for each file or partition of each table of a database, it can take many minutes or even hours to respond to a query. In certain implementations this may not be an acceptable use of computing resources. The data structure 1000 disclosed herein provides increased metadata granularity and enables multi-level pruning of database data and/or data stored in an external table. During compilation and optimization of a query on the database, a processor may scan the cumulative table metadata 1002 to determine if the table includes information pertaining to the query. In response to determining, based on the cumulative table metadata 1002, that the table includes information pertaining to the query, the processor may scan each of the grouping expression properties 1014 to determine which grouping of partitions of the table include information pertaining to the query. In response to determining, based on a first cumulative expression property, that a first grouping of partitions does not include information pertaining to the query, the processor may discontinue database scanning of that first grouping of partitions. In response to determining, based on a second cumulative expression property, that a second grouping of partitions includes information pertaining to the query, the processor may proceed to scan expression properties for that second grouping of partitions. The processor may efficiently determine which partitions include pertinent data and which columns of which partitions include pertinent data. The processor may proceed to scan only the relevant column(s) and partition(s) that include information relevant to a database query. This provides a cost efficient means for responding to a database query by way of multi-level pruning based on multi-level table metadata.

Further to increase the cost efficiency of database queries, a resource manager (may also be referred to as a "global services") may store the cumulative table metadata 1002 in a cache for faster retrieval. Metadata for the database may be stored in a metadata store separate and independent of a plurality of shared storage devices collectively storing database data. In a different embodiment, metadata for the database may be stored within the plurality of shared storage devices collectively storing database data. In various embodiments, metadata may be stored in metadata-specific partitions that do not include database data, and/or may be stored within partitions that also include database data. The metadata may be stored across disk storage, such as the plurality of shared storage devices, and it may also be stored in cache within the resource manager.

Figure 11A:
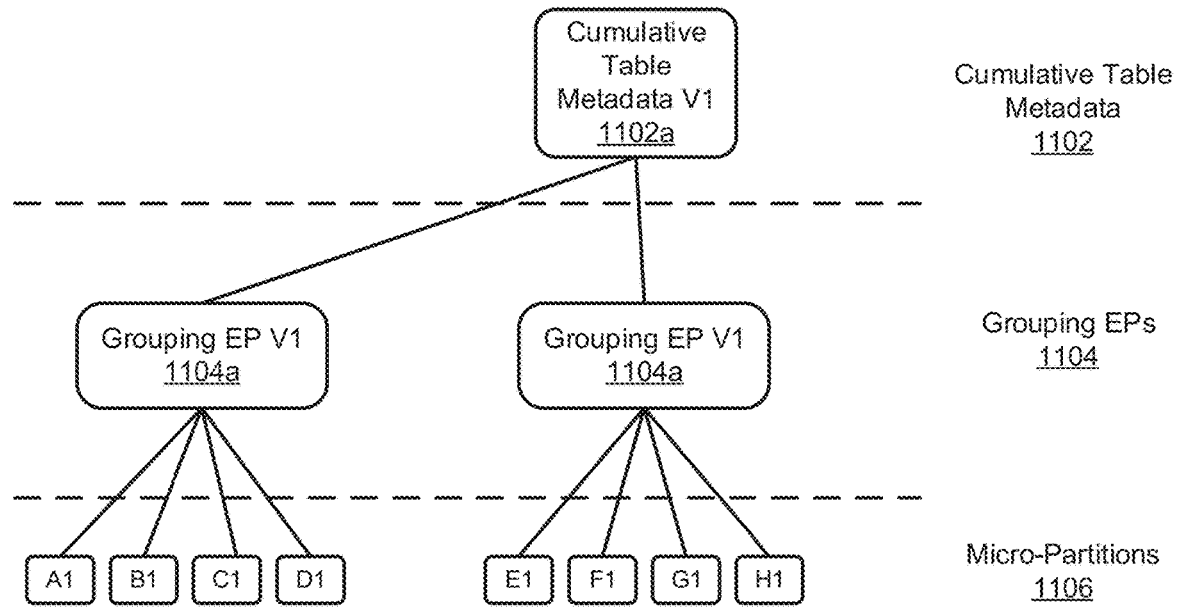
FIGS. 11A-11C are schematic diagrams of a data structure for versioning and refreshing of data and metadata in a database system, according to one embodiment.
Figure 11B:
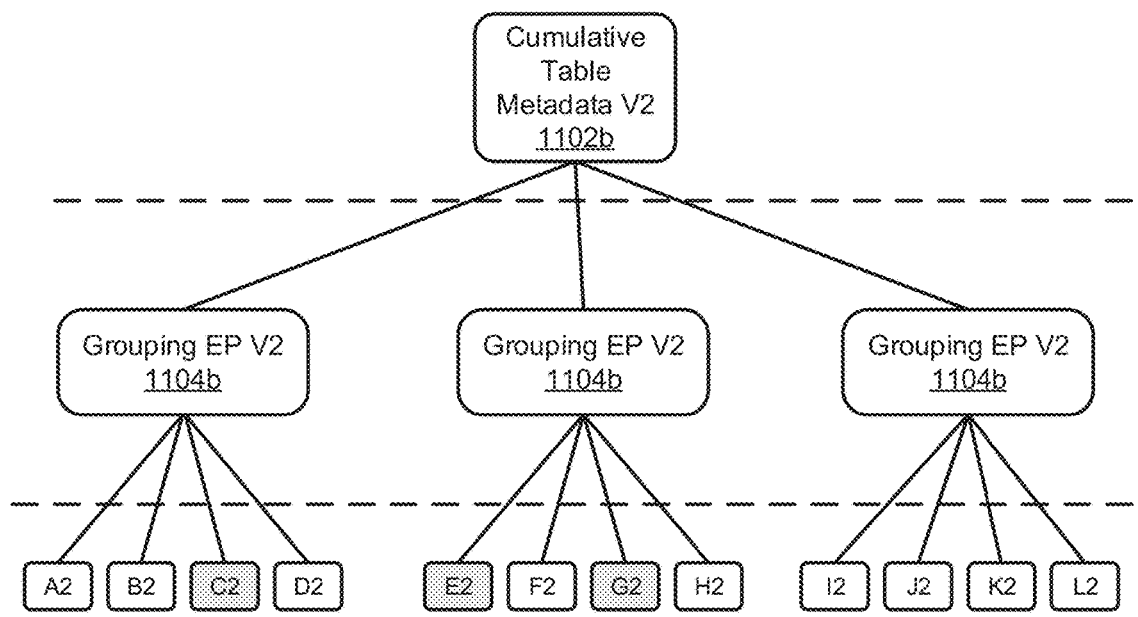
Figure 11C:
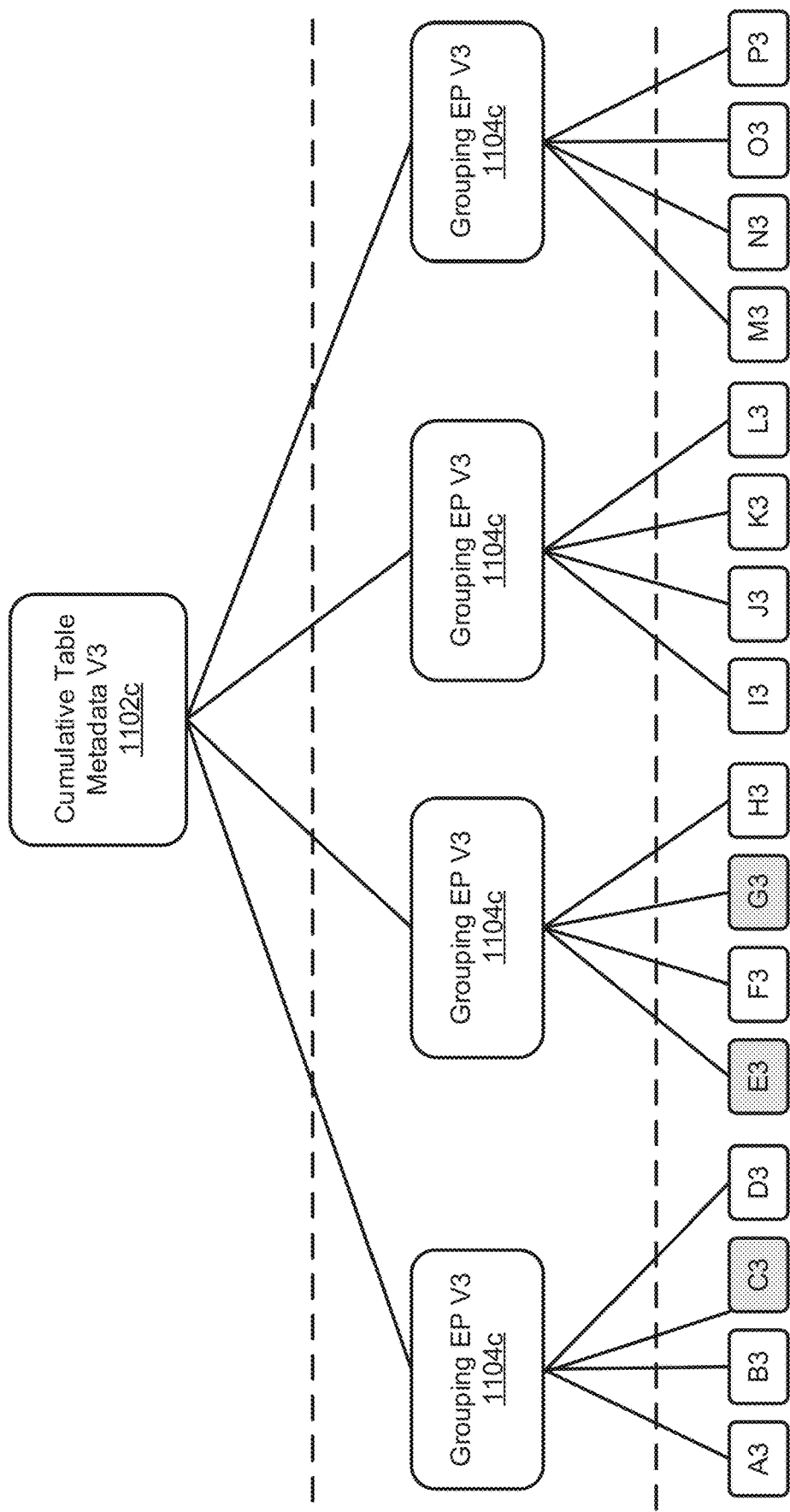

FIGS. 11A-11C illustrate the generation of cumulative table metadata 1102 across multiple versions of a table. The table may be stored internally to a database platform or may be an external table. The metadata versioning as illustrated in FIGS. 11A-11C may be executed by any suitable computing device, including an database platform 102 and specifically an external table metadata component 606 and/or a metadata refresh component 608. The refreshing and versioning of table metadata may be prompted by receiving a notification from a data lake that a source table supporting an external table has been modified. The metadata structure depicted in FIGS. 11A-11C follows the data structure 1000 disclosed in FIG. 10. Accordingly, there is cumulative table metadata 1102 including global information about the table, along with grouping expression properties 1104 for each grouping of table partitions. Further, the table includes a plurality of partitions each serving as an immutable storage device for storing database data that cannot be updated in-place.

FIG. 11A illustrates metadata for a first version (V1) of the table. The table has version one cumulative table metadata 1102a and version one grouping expression properties 1104a each including global information about a grouping of partitions 1106 of the table. Version 1 of the partitions, including A1, B1, C1, D1, E1, F1, G1, and H1 are illustrated in FIG. 11A. The table includes a plurality of partitions each storing a subset of the database data in the table.

FIG. 11B illustrates metadata for a second version (V2) of the table that includes a second version of the partitions, including A2, B2, C2, D2, E2, F2, G2, H2, I2, J2, K2, and L2. The greyed partitions (C2, E2, and G2) illustrate partitions that were deleted by a transaction execution on the table. The new partitions (I2, J2, K2, and L2) illustrate partitions that were added to the table by a transaction that was executed on the table. The non-greyed existing partitions (A2, B2, D2, F2, and H2) illustrate partitions that were not modified by any transaction executed on the table. As shown in FIG. 11B, a version two cumulative table metadata 1102b is generated in response to a new version of the table being generated by one or more transactions being executed on the table. Further, new version two grouping expression properties 1104b are generated in response to the new version of the table being generated by the one or more transactions executed on the table. In an embodiment, when partitions are deleted from a grouping of partitions, but no new partitions were added to the grouping, the grouping expression properties 1104b may not need to be recomputed. The minimum value, maximum value, number of nulls, and number of distinct values may now be overestimated, but may still be considered safe by the database client. The overestimated values may lead an optimizer to suboptimal decisions but not to wrong query results. In this embodiment, the grouping expression properties 1104b may still be recomputed for the sake of optimizer efficiency. In the example illustrated in FIG. 1B, after partitions C2, E2, and G2 are deleted, the existing grouping expression properties 1104b for the first and second grouping are still safe to use. These grouping expression properties 1104b may not be recomputed or may be recomputed in a later phase. For each new version of the table, the grouping expression properties may be computed for groupings of newly added partitions, and this may lead to efficient calculation of global grouping expression properties. Each of the partitions 1106 of the table constitutes an immutable storage device that cannot be updated in-place. Therefore, in response to a transaction being executed on the table, such as a DML command, a new partition is generated to reflect the transaction and replace the prior partition.

FIG. 11C illustrates metadata for a third version (V3) of the table. As illustrated, new partitions have been added to the table in version three, including partitions M3, N3, O3, and P3. An updated version three cumulative table metadata 1102c provides global information about the table, and updated version three grouping expression properties 1104c each provide global information about their associated groupings of version three partitions.

Figure 12:
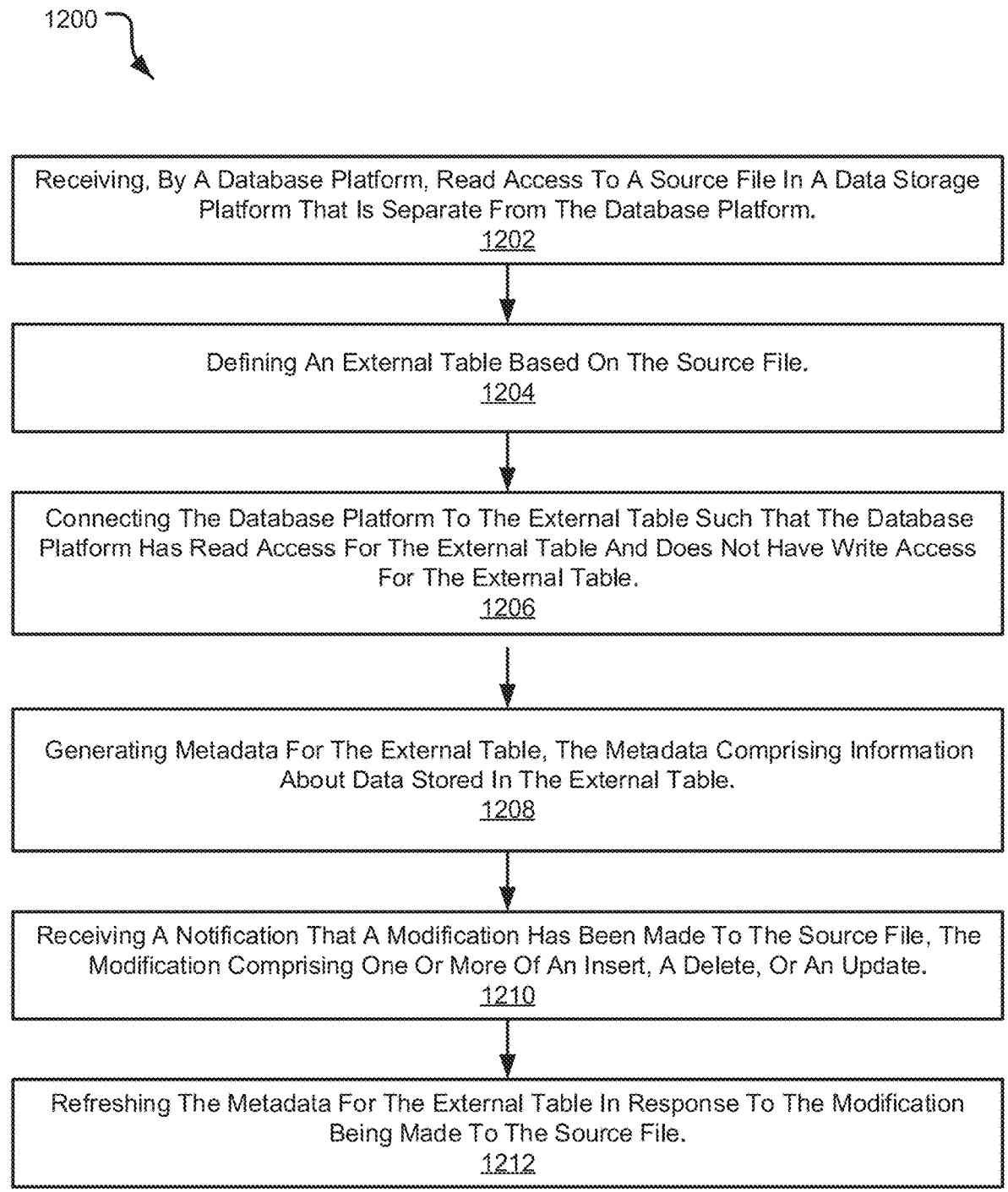
FIG. 12 is a schematic flow chart diagram of a method for automatically maintaining an external table in a database system, according to one embodiment.

FIG. 12 is a schematic flow chart diagram of a method 1200 for maintaining an external table in a database system. The method 1200 may be performed by any suitable computing device such as a resource manager 302 or database platform 102 as disclosed herein.

The method 1200 begins and the computing device receives at 1202 read access to a source directory in a data storage platform. The computing device is associated with a database platform that is separate from the data storage platform. The computing device defines at 1204 an external table based on the source directory. The computing device connects at 1206 the database platform to the external table such that the database platform has read access for the external table and does not have write access for the external table. The computing device generates at 1208 metadata for the external table, the metadata including information about data stored in the external table. The computing device receives at 1210 a notification that a modification has been made to the source directory, the modification including one or more of an insert, a delete, or an update. The computing device refreshes at 1212 the metadata for the external table in response to the modification being made to the source directory.

Figure 13:
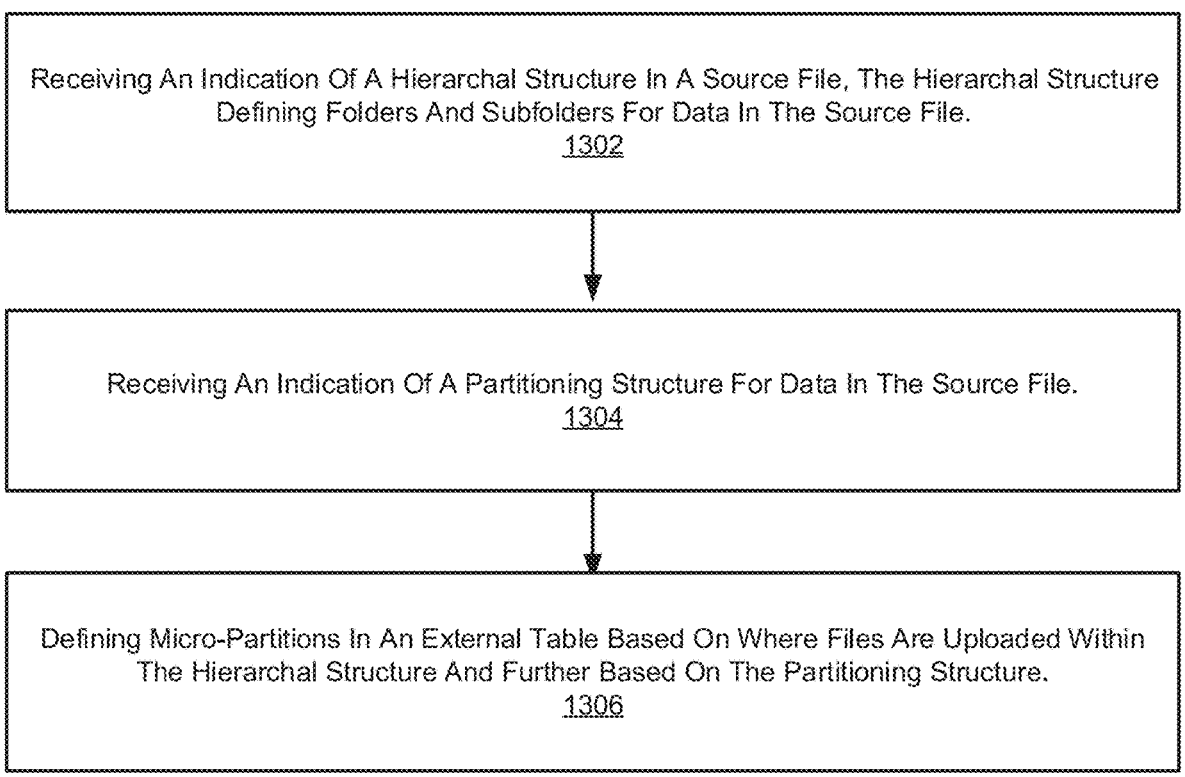
FIG. 13 is a schematic flow chart diagram of a method for defining an external table in a database system, according to one embodiment.

FIG. 13 is a schematic flow chart diagram of a method 1300 for defining an external table in a database system. The method 1300 may be performed by any suitable computing device such as a resource manager 302 or database platform 102 as disclosed herein.

The method 1300 begins and the computing device receives at 1302 an indication of a hierarchical structure in a source directory, the hierarchical structure defining folders and subfolders for data in the source directory. The computing device receives at 1304 an indication of a partitioning structure for data in the source directory. The computing device defines at 1306 partitions in an external table based on where files are uploaded within the hierarchical structure and further based on the partitioning structure.

Figure 14:
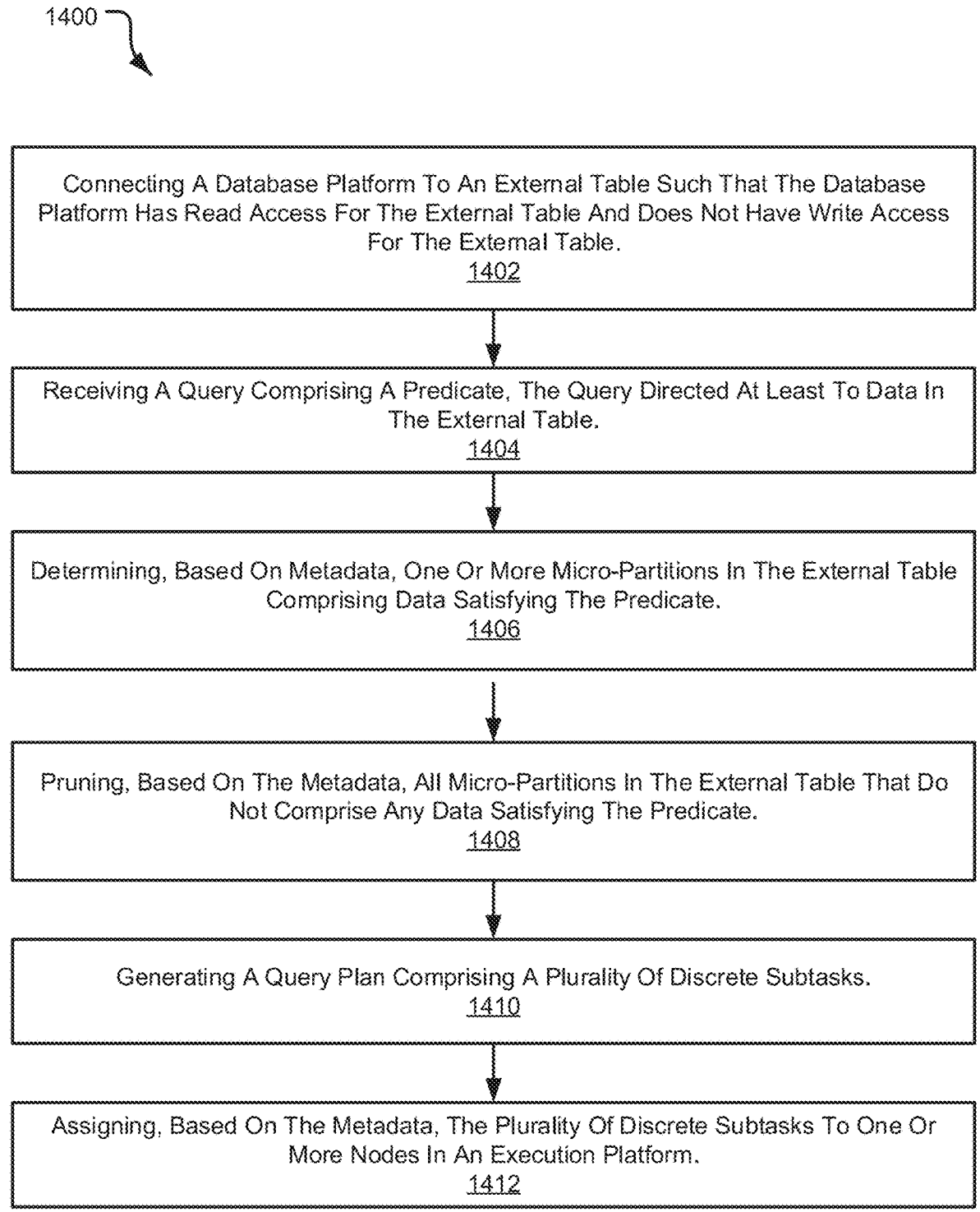
FIG. 14 is a schematic flow chart diagram of a method for querying an external table in a database system, according to one embodiment.

FIG. 14 is a schematic flow chart diagram of a method 1400 for querying an external table in a database system. The method 1400 may be performed by any suitable computing device such as a resource manager 302 or database platform 102 as disclosed herein.

The method 1400 begins and the computing device connects at 1402 a database platform to an external table such that the database platform has read access for the external table and does not have write access for the external table. The computing device receives at 1404 a query including a predicate, the query directed at least to data in the external table. The computing device determines at 1406, based on metadata, one or more partitions in the external table including data satisfying the predicate. The computing device prunes at 1408, based on the metadata, all partitions in the external table that do not include any data satisfying the predicate. The computing device generates at 1410 a query plan including a plurality of discrete subtasks. The computing device assigns at 1412, based on the metadata, the plurality of discrete subtasks to one or more nodes in an execution platform.

Figure 15:
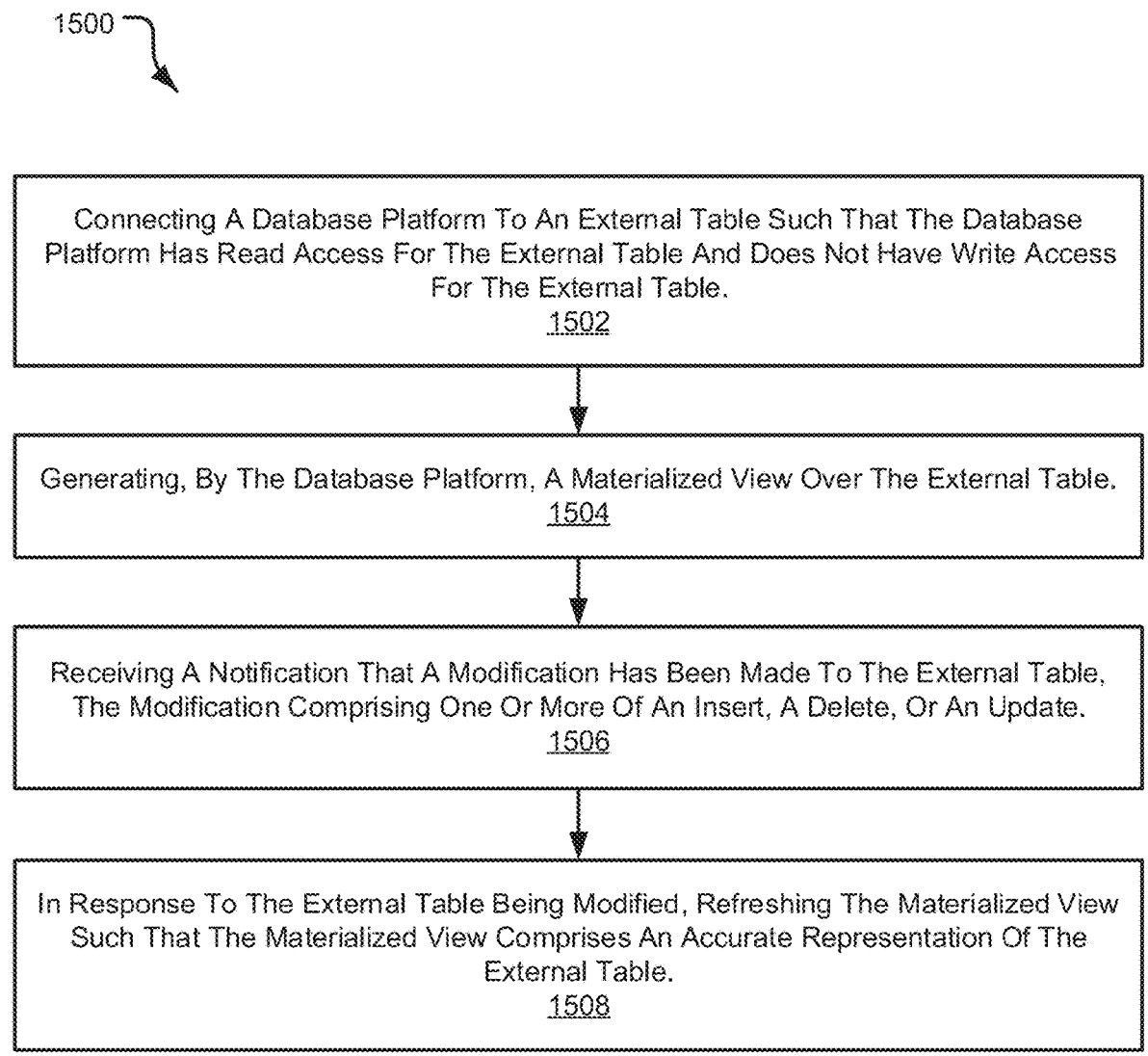
FIG. 15 is a schematic flow chart diagram of a method for generating a materialized view over an external table in a database system, according to one embodiment.

FIG. 15 is a schematic flow chart diagram of a method 1500 for generating a materialized view over an external table in a database system. The method 1500 may be performed by any suitable computing device such as a resource manager 302 or database platform 102 as disclosed herein.

The method 1500 begins and the computing device connects at 1502 a database platform to an external table such that the database platform has read access for the external table and does not have write access for the external table. The computing device generates at 1504 a materialized view over the external table. The computing device receives at 1506 a notification that a modification has been made to the external table, the modification including one or more of an insert, a delete, or an update. The computing device, in response to the external table being modified, refreshes at 1508 the materialized view such that the materialized view comprises an accurate representation of the external table.

Figure 16:
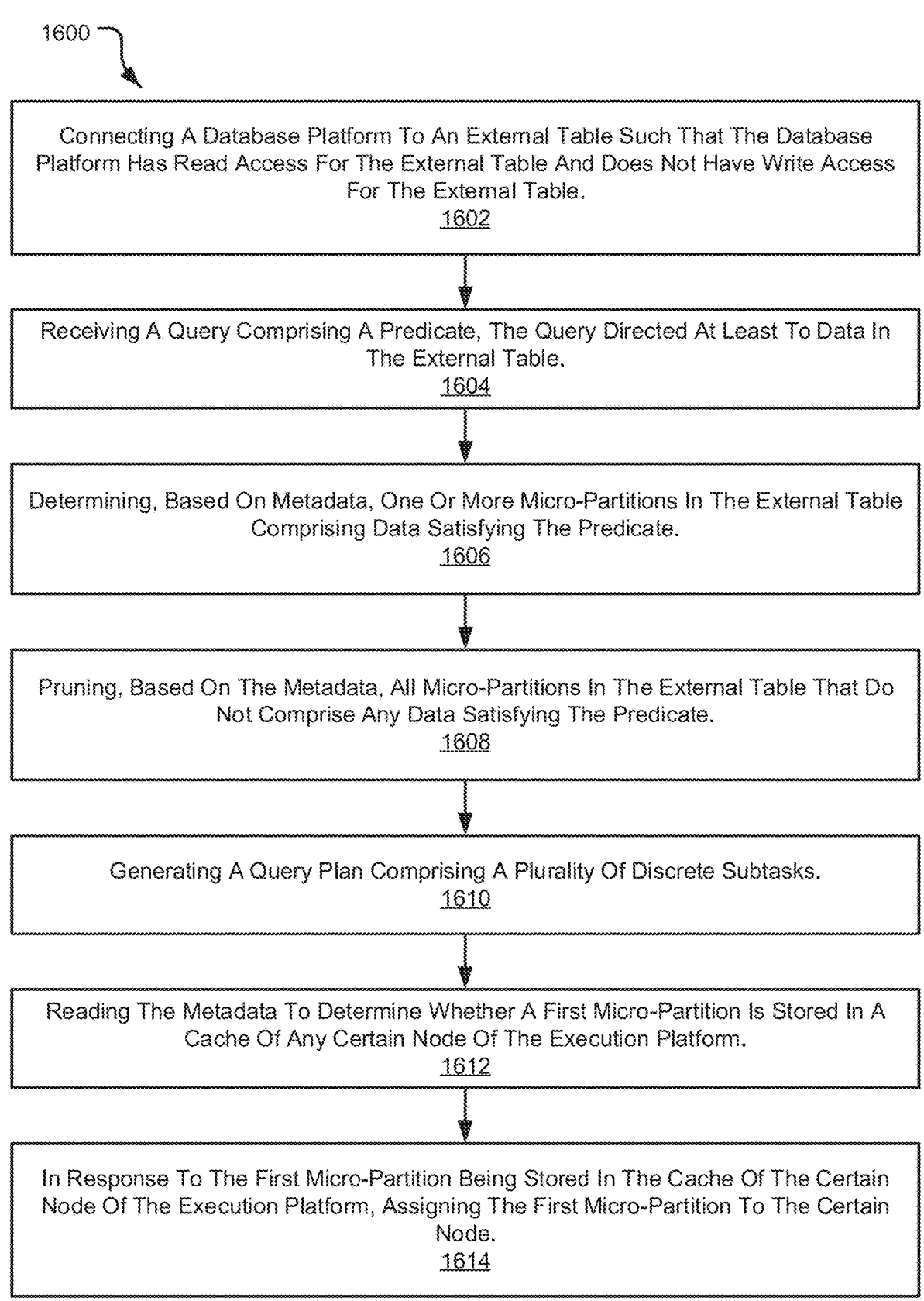
FIG. 16 is a schematic flow chart diagram of a method for querying an external table in a database system, according to one embodiment.

FIG. 16 is a schematic flow chart diagram of a method 1600 for querying an external table in a database system. The method 1600 may be performed by any suitable computing device such as a resource manager 302 or database platform 102 as disclosed herein.

The method 1600 begins and the computing device connects at 1602 a database platform to an external table such that the database platform has read access for the external table and does not have write access for the external table. The computing device receives at 1604 a query including a predicate, the query directed at least to data in the external table. The computing device determines at 1606, based on metadata, one or more partitions in the external table including data satisfying the predicate. The computing device prunes at 1608, based on the metadata, all partitions in the external table that do not include any data satisfying the predicate. The computing device generates at 1610 a query plan including a plurality of discrete subtasks. The computing device reads at 1612 the metadata to determine whether a first partition is stored in a cache of any certain node of the execution platform. The computing device, in response to the first partition being stored in the cache of the certain node of the execution platform, assigns at 1614 the first partition to the certain node to be processed by the certain node.

Figure 17:
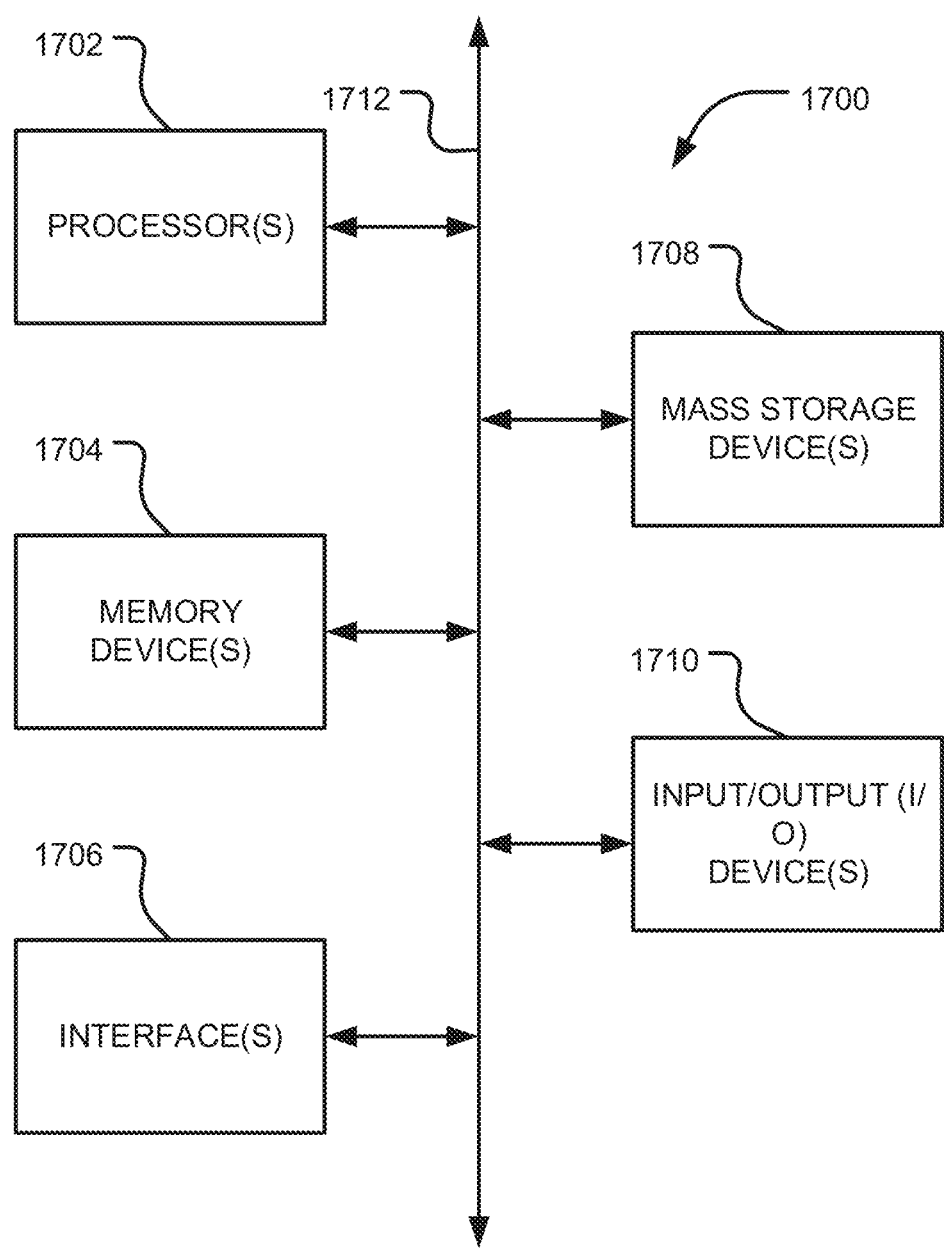
FIG. 17 is a schematic diagram of an example computing device, according to one embodiment.

FIG. 17 is a block diagram depicting an example computing device 1700. In some embodiments, computing device 1700 is used to implement one or more of the systems and components discussed herein. Further, computing device 1700 may interact with any of the systems and components described herein. Accordingly, computing device 1700 may be used to perform various procedures and tasks, such as those discussed herein. Computing device 1700 can function as a server, a client or any other computing entity. Computing device 1700 can be any of a wide variety of computing devices, such as a desktop computer, a notebook computer, a server computer, a handheld computer, a tablet, and the like.

Computing device 1700 includes one or more processor(s) 1702, one or more memory device(s) 1704, one or more interface(s) 1706, one or more mass storage device(s) 1708, and one or more Input/Output (10) device(s) 1710, all of which are coupled to a bus 1712. Processor(s) 1702 include one or more processors or controllers that execute instructions stored in memory device(s) 1704 and/or mass storage device(s) 1708. Processor(s) 1702 may also include various types of computer-readable media, such as cache memory.

Memory device(s) 1704 include various computer-readable media, such as volatile memory (e.g., random access memory (RAM)) and/or nonvolatile memory (e.g., read-only memory (ROM)). Memory device(s) 1704 may also include rewritable ROM, such as Flash memory.

Mass storage device(s) 1708 include various computer readable media, such as magnetic tapes, magnetic disks, optical disks, solid state memory (e.g., Flash memory), and so forth. Various drives may also be included in mass storage device(s) 1708 to enable reading from and/or writing to the various computer readable media. Mass storage device(s) 1708 include removable media and/or non-removable media.

I/O device(s) 1710 include various devices that allow data and/or other information to be input to or retrieved from computing device 1700. Example I/O device(s) 1710 include cursor control devices, keyboards, keypads, microphones, monitors or other display devices, speakers, printers, network interface cards, modems, lenses, CCDs or other image capture devices, and the like.

Interface(s) 1706 include various interfaces that allow computing device 1700 to interact with other systems, devices, or computing environments. Example interface(s) 1706 include any number of different network interfaces, such as interfaces to local area networks (LANs), wide area networks (WANs), wireless networks, and the Internet.

Bus 1712 allows processor(s) 1702, memory device(s) 1704, interface(s) 1706, mass storage device(s) 1708, and I/O device(s) 1710 to communicate with one another, as well as other devices or components coupled to bus 1712. Bus 912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1700 and are executed by processor(s) 1702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the terms "module" or "component" are intended to convey the implementation apparatus for accomplishing a process, such as by hardware, or a combination of hardware, software, and/or firmware, for the purposes of performing all or parts of operations disclosed herein. The terms "module" or "component" are intended to convey independent in how the modules, components, or their functionality or hardware may be implemented in different embodiments.

Examples

The following examples pertain to further embodiments.

Example 1 is a system for generating a materialized view over an external table. The system includes means for connecting a database platform to an external table such that the database platform has read access for the external table and does not have write access for the external table. The system includes means for generating a materialized view over the external table. The system includes means for receiving a notification that a modification has been made to the external table, the modification comprising one or more of an insert, a delete, or an update. The system includes means for refreshing the materialized view in response to the external table being modified such that the materialized view comprises an accurate representation of the external table.

Example 2 is a system as in Example 1, wherein the external table is based on a source directory in a data storage platform, wherein the data storage platform is separate from the database platform.

Example 3 is a system as in any of Examples 1-2, further comprising means for determining content for the materialized view, wherein the means for determining the content comprises one or more of: means for receiving an indication to generate the materialized view with the content; means for receiving a query on the external table, the query directed to the content; or means for determining the content based on one or more rows or partitions of the external table that are frequently queried.

Example 4 is a system as in any of Examples 1-3, wherein the means for receiving the notification comprises one or more of: means for querying the data storage platform to determine whether any modifications have been made to the source directory; means for receiving a notification from the data storage platform that a modification has been made to the source directory; or means for receiving a notification from a client associated with the source directory, the notification indicating that the modification has been made to the source directory.

Example 5 is a system as in any of Examples 1-4, wherein the means for refreshing the materialized view comprises means for generating a new materialized view and means for removing an original materialized view that is now stale with respect to the external table.

Example 6 is a system as in any of Examples 1-5, further comprising: means for receiving a query; means for determining one or more partitions in the external table that are necessary to respond to the query by reading metadata for the external table; and means for determining whether a corresponding materialized view has been generated for at least one of the one or more partitions.

Example 7 is a system as in any of Examples 1-6, further comprising: means for generating a query plan for responding to the query, the query plan comprising a plurality of discrete subtasks; and means for assigning the plurality of discrete subtasks to one or more nodes of an execution platform; wherein, in response to there being the corresponding materialized view for at least one of the one or more partitions, at least one of the plurality of discrete subtasks comprises reading the corresponding materialized view; and wherein, in response to there being no corresponding materialized view for at least one of the one or more partitions, at least one of the plurality of discrete subtasks comprises reading the external table.

Example 8 is a system as in any of Examples 1-7, further comprising means for determining whether the corresponding materialized view is stale with respect to the at least one of the one or more partitions.

Example 9 is a system as in any of Examples 1-8, further comprising means for generating metadata for the materialized view, the metadata comprising one or more of: an identification of one or more partitions of the external table that are materialized in the materialized view; a minimum/maximum value pair for each of the one or more partitions that are materialized in the materialized view; or a timestamp for a most recent refresh of the materialized view.

Example 10 is a system as in any of Examples 1-9, further comprising: means for reading a timestamp for a most recent modification to the external table for each of the one or more partitions that are materialized in the materialized view; means for reading the timestamp for the most recent refresh of the materialized view; and means for determining whether the materialized view is stale with respect to the external table based on the timestamp for the most recent refresh of the materialized view and each timestamp for the most recent modification to the external table for each of the one or more partitions that are materialized in the materialized view.

Example 11 is a method for generating a materialized view over an external table. The method includes connecting a database platform to an external table such that the database platform has read access for the external table and does not have write access for the external table. The method includes generating, by the database platform, a materialized view over the external table. The method includes receiving a notification that a modification has been made to the external table, the modification comprising one or more of an insert, a delete, or an update. The method includes, in response to the external table being modified, refreshing the materialized view such that the materialized view comprises an accurate representation of the external table.

Example 12 is a method as in Example 11, wherein the external table is based on a source directory in a data storage platform, wherein the data storage platform is separate from the database platform.

Example 13 is a method as in any of Examples 11-12, further comprising determining content for the materialized view by one or more of; receiving an indication to generate the materialized view with the content; receiving a query on the external table, the query directed to the content; or determining the content based on one or more rows or partitions of the external table that are frequently queried.

Example 14 is a method as in any of Examples 11-13, wherein receiving the notification comprises one or more of: querying the data storage platform to determine whether any modifications have been made to the source directory; receiving a notification from the data storage platform that a modification has been made to the source directory; or receiving a notification from a client associated with the source directory, the notification indicating that the modification has been made to the source directory.

Example 15 is a method as in any of Examples 11-14, wherein refreshing the materialized view comprises generating a new materialized view and removing an original materialized view that is now stale with respect to the external table.

Example 16 is a method as in any of Examples 11-15, further comprising: receiving a query; determining one or more partitions in the external table that are necessary to respond to the query by reading metadata for the external table; and determining whether a corresponding materialized view has been generated for at least one of the one or more partitions.

Example 17 is a method as in any of Examples 11-16, further comprising: generating a query plan for responding to the query, the query plan comprising a plurality of discrete subtasks; and assigning the plurality of discrete subtasks to one or more nodes of an execution platform; wherein, in response to there being the corresponding materialized view for at least one of the one or more partitions, at least one of the plurality of discrete subtasks comprises reading the corresponding materialized view; and wherein, in response to there being no corresponding materialized view for at least one of the one or more partitions, at least one of the plurality of discrete subtasks comprises reading the external table.

Example 18 is a method as in any of Examples 11-17, further comprising determining whether the corresponding materialized view is stale with respect to the at least one of the one or more partitions.

Example 19 is a method as in any of Examples 11-18, further comprising generating metadata for the materialized view, the metadata comprising one or more of: an identification of one or more partitions of the external table that are materialized in the materialized view; a minimum/maximum value pair for each of the one or more partitions that are materialized in the materialized view; or a timestamp for a most recent refresh of the materialized view.

Example 20 is a method as in any of Examples 11-19, further comprising: reading a timestamp for a most recent modification to the external table for each of the one or more partitions that are materialized in the materialized view; reading the timestamp for the most recent refresh of the materialized view; and determining whether the materialized view is stale with respect to the external table based on the timestamp for the most recent refresh of the materialized view and each timestamp for the most recent modification to the external table for each of the one or more partitions that are materialized in the materialized view.

Example 21 is a processor that is programmable to execute instructions stored in non-transitory computer readable storage media. The instructions include connecting a database platform to an external table such that the database platform has read access for the external table and does not have write access for the external table. The instructions include generating, by the database platform, a materialized view over the external table. The instructions include receiving a notification that a modification has been made to the external table, the modification comprising one or more of an insert, a delete, or an update. The instructions include, in response to the external table being modified, refreshing the materialized view such that the materialized view comprises an accurate representation of the external table. The instructions are such that the external table is based on a source directory in a data storage platform, wherein the data storage platform is separate from the database platform.

Example 22 is a processor as in Example 21, wherein the instructions further comprise determining content for the materialized view by one or more of: receiving an indication to generate the materialized view with the content; receiving a query on the external table, the query directed to the content or determining the content based on one or more rows or partitions of the external table that are frequently queried.

Example 23 is a processor as in any of Examples 21-22, wherein receiving the notification comprises one or more of: querying the data storage platform to determine whether any modifications have been made to the source directory; receiving a notification from the data storage platform that a modification has been made to the source directory; or receiving a notification from a client associated with the source directory, the notification indicating that the modification has been made to the source directory.

Example 24 is a processor as in any of Examples 21-23, wherein refreshing the materialized view comprises generating a new materialized view and removing an original materialized view that is now stale with respect to the external table.

Example 25 is a processor as in any of Examples 21-24, wherein the instructions further comprise: receiving a query; determining one or more partitions in the external table that are necessary to respond to the query by reading metadata for the external table; determining whether a corresponding materialized view has been generated for at least one of the one or more partitions; generating a query plan for responding to the query, the query plan comprising a plurality of discrete subtasks; and assigning the plurality of discrete subtasks to one or more nodes of an execution platform; wherein, in response to there being the corresponding materialized view for at least one of the one or more partitions, at least one of the plurality of discrete subtasks comprises reading the corresponding materialized view; and wherein, in response to there being no corresponding materialized view for at least one of the one or more partitions, at least one of the plurality of discrete subtasks comprises reading the external table.

Example 26 is a system for querying over an external table. The system includes means for connecting a database platform to an external table such that the database platform has read access for the external table and does not have write access for the external table. The system includes means for receiving a query comprising a predicate, the query directed at least to data in the external table. The system includes means for determining, based on metadata, one or more partitions in the external table comprising data satisfying the predicate. The system includes means for pruning, based on the metadata, all partitions in the external table that do not comprise any data satisfying the predicate. The system includes means for generating a query plan comprising a plurality of discrete subtasks. The system includes means for assigning, based on the metadata, the plurality of discrete subtasks to one or more nodes in an execution platform.

Example 27 is a system as in Example 26, wherein the external table is based on a source directory in a data storage platform, wherein the data storage platform is separate from the database platform.

Example 28 is a system as in any of Examples 26-27, further comprising: means for determining, based on the metadata, one or more partitions in internal database data comprising data satisfying the predicate; and means for pruning, based on the metadata, all partitions in the internal database data that do not comprise any data satisfying the predicate; wherein the database platform has read access and further has write access to the internal database data.

Example 29 is a system as in any of Examples 26-28, wherein, in response to there being one or more partitions from each of the external table and the internal database data that comprise data satisfying the predicate, the plurality of discrete subtasks of the query plan comprise tasks for processing partitions in the external table and further for processing partitions in the internal database data.

Example 30 is a system as in any of Examples 26-29, wherein the means for assigning, based on the metadata, the plurality of discrete subtasks further comprises: means for reading the metadata to determine whether a first partition is stored in a cache of any certain node of the execution platform; and in response to the first partition being stored in the cache of the certain node of the execution platform, means for assigning the first partition to the certain node.

Example 31 is a system as in any of Examples 26-30, further comprising means for generating the metadata, wherein the metadata comprises information about data stored in the external table, the information comprising one or more of: cumulative table metadata for the external table; a grouping expression property for a grouping of partitions in the external table; an expression property for a partition of the external table; partition statistics for a partition of the external table; or a column expression property for a column of a partition of the external table.

Example 32 is a system as in any of Examples 26-31, further comprising means for receiving a notification that a modification has been made to the external table, the modification comprising one or more of an insert, a delete, or an update.

Example 33 is a system as in any of Examples 26-32, further comprising means for refreshing the metadata in response to the modification being made to the external table.

Example 34 is a system as in any of Examples 26-33, further comprising means for refreshing the metadata in response to a threshold number of modifications being made to the external table.

Example 35 is a system as in any of Examples 26-34, further comprising means for storing the metadata in a partition storage object on a shared storage platform associated with the database platform, wherein the shared storage platform is separate from the external table.

Example 36 a method for querying over an external table. The method includes connecting a database platform to an external table such that the database platform has read access for the external table and does not have write access for the external table. The method includes receiving a query comprising a predicate, the query directed at least to data in the external table. The method includes determining, based on metadata, one or more partitions in the external table comprising data satisfying the predicate. The method includes pruning, based on the metadata, all partitions in the external table that do not comprise any data satisfying the predicate. The method includes generating a query plan comprising a plurality of discrete subtasks. The method includes assigning, based on the metadata, the plurality of discrete subtasks to one or more nodes in an execution platform.

Example 37 is a method as in Example 36, wherein the external table is based on a source directory in a data storage platform, wherein the data storage platform is separate from the database platform.

Example 38 is a method as in any of Examples 36-37, further comprising: determining, based on the metadata, one or more partitions in internal database data comprising data satisfying the predicate; and pruning, based on the metadata, all partitions in the internal database data that do not comprise any data satisfying the predicate; wherein the database platform has read access and further has write access to the internal database data.

Example 39 is a method as in any of Examples 36-38, wherein, in response to there being one or more partitions from each of the external table and the internal database data that comprise data satisfying the predicate, the plurality of discrete subtasks of the query plan comprise tasks for processing partitions in the external table and further for processing partitions in the internal database data.

Example 40 is a method as in any of Examples 36-39, wherein assigning, based on the metadata, the plurality of discrete subtasks further comprises: reading the metadata to determine whether a first partition is stored in a cache of any certain node of the execution platform; and in response to the first partition being stored in the cache of the certain node of the execution platform, assigning the first partition to the certain node.

Example 41 is a method as in any of Examples 36-40, further comprising generating the metadata, wherein the metadata comprises information about data stored in the external table, the information comprising one or more of: cumulative table metadata for the external table; a grouping expression property for a grouping of partitions in the external table; an expression property for a partition of the external table; partition statistics for a partition of the external table; or a column expression property for a column of a partition of the external table.

Example 42 is a method as in any of Examples 36-41, further comprising receiving a notification that a modification has been made to the external table, the modification comprising one or more of an insert, a delete, or an update.

Example 43 is a method as in any of Examples 36-42, further comprising refreshing the metadata in response to the modification being made to the external table.

Example 44 is a method as in any of Examples 36-43, further comprising refreshing the metadata in response to a threshold number of modifications being made to the external table.

Example 45 is a method as in any of Examples 36-44, further comprising storing the metadata in a partition storage object on a shared storage platform associated with the database platform, wherein the shared storage platform is separate from the external table.

Example 47 is a processor that is programmable to execute instructions stored in non-transitory computer readable storage media, the instructions comprising: connecting a database platform to an external table such that the database platform has read access for the external table and does not have write access for the external table; receiving a query comprising a predicate, the query directed at least to data in the external table; determining, based on metadata, one or more partitions in the external table comprising data satisfying the predicate; pruning, based on the metadata, all partitions in the external table that do not comprise any data satisfying the predicate; generating a query plan comprising a plurality of discrete subtasks; and assigning, based on the metadata, the plurality of discrete subtasks to one or more nodes in an execution platform; wherein the external table is based on a source directory in a data storage platform, wherein the data storage platform is separate from the database platform.

Example 48 is a processor as in Example 47, the instructions further comprising: determining, based on the metadata, one or more partitions in internal database data comprising data satisfying the predicate; and pruning, based on the metadata, all partitions in the internal database data that do not comprise any data satisfying the predicate; wherein the database platform has read access and further has write access to the internal database data; and wherein, in response to there being one or more partitions from each of the external table and the internal database data that comprise data satisfying the predicate, the plurality of discrete subtasks of the query plan comprise tasks for processing data partitions in the external table and further for processing partitions in the internal database data.

Example 49 is a processor as in any of Examples 47-48, wherein assigning, based on the metadata, the plurality of discrete subtasks further comprises: reading the metadata to determine whether a first partition is stored in a cache of any certain node of the execution platform: and in response to the first partition being stored in the cache of the certain node of the execution platform, assigning the first partition to the certain node.

Example 50 is a processor as in any of Examples 47-49, wherein the instructions further comprise generating the metadata, wherein the metadata comprises information about data stored in the external table, the information comprising one or more of: cumulative table metadata for the external table; a grouping expression property for a grouping of partitions in the external table; an expression property for a partition of the external table; partition statistics for a partition of the external table; or a column expression property for a column of a partition of the external table.

Example 51 is a processor as in any of Examples 47-50, wherein the instructions further comprise: receiving a notification that a modification has been made to the external table, the modification comprising one or more of an insert, a delete, or an update; and refreshing the metadata in response to the modification being made to the external table.

Example 52 is a system. The system includes means for receiving, by a database platform, read access to a source directory in a data storage platform that is separate from the database platform. The system includes means for defining an external table based on the source directory. The system includes means for connecting the database platform to the external table such that the database platform has read access for the external table and does not have write access for the external table. The system includes means for generating metadata for the external table, the metadata comprising information about data stored in the external table. The system includes means for receiving a notification that a modification has been made to the source directory, the modification comprising one or more of an insert, a delete, or an update. The system includes means for refreshing the metadata for the external table in response to the modification being made to the source directory.

Example 53 is a system as in Example 52, wherein the means for generating the metadata comprises one or more of: means for defining cumulative table metadata for the external table; means for defining a grouping expression property for a grouping of partitions in the external table; means for defining an expression property for a partition of the external table; means for defining partition statistics for a partition of the external table; or means for defining a column expression property for a column of a partition of the external table.

Example 54 is a system as in any of Examples 52-53, further comprising means for storing the metadata in a partition storage object on a shared storage platform associated with the database platform, wherein the shared storage platform is separate from the data storage platform.

Example 55 is a system as in any of Examples 52-54, wherein the means for refreshing the metadata comprises one or more of: means for refreshing the metadata in response to any modification being made to the source directory; means for refreshing the metadata at threshold time periods; means for refreshing the metadata in response to a threshold number of modifications being made to the source directory; or means for refreshing the metadata in response to a client request to refresh the metadata.

Example 56 is a system as in any of Examples 52-55, further comprising means for reading multiple different file formats in the source directory.

Example 57 is a system as in any of Examples 52-56, wherein the means for receiving the notification comprises one or more of: means for querying the data storage platform to determine whether any modifications have been made to the source directory; means for receiving a notification from the data storage platform that a modification has been made to the source directory; or means for receiving a notification from a client associated with the source directory, the notification indicating that the modification has been made to the source directory.

Example 58 is a system as in any of Examples 52-57, wherein the means for defining the external table based on the source directory comprises: means for receiving an indication of a hierarchal structure in the source directory, the hierarchal structure defining folders and subfolders for data in the source directory; means for receiving an indication of a partitioning structure for data in the source directory; and means for defining partitions in the external table based on where files are uploaded within the hierarchical structure and further based on the partitioning structure.

Example 59 is a system as in any of Examples 52-58, wherein the means for defining the partitions in the external table comprises means for generating metadata for the partitions in the external table and means for pointing the metadata to the appropriate folders and subfolders in the source directory.

Example 60 is a system as in any of Examples 52-59, wherein the means for receiving the notification comprises means for receiving a notification that a certain subfolder within the source directory has been modified.

Example 61 is a system as in any of Examples 52-60, further comprising: means for identifying a certain partition in the external table that corresponds with the certain subfolder within the source directory; and means for generating change tracking metadata for the certain partition indicating how the certain subfolder was modified and when the certain subfolder was modified.

Example 62 is a method. The method includes receiving, by a database platform, read access to a source directory in a data storage platform that is separate from the database platform. The method includes defining an external table based on the source directory. The method includes connecting the database platform to the external table such that the database platform has read access for the external table and does not have write access for the external table. The method includes generating metadata for the external table, the metadata comprising information about data stored in the external table. The method includes receiving a notification that a modification has been made to the source directory, the modification comprising one or more of an insert, a delete, or an update. The method includes refreshing the metadata for the external table in response to the modification being made to the source directory.

Example 63 is a method as in Example 62, wherein generating the metadata comprises one or more of: defining cumulative table metadata for the external table; defining a grouping expression property for a grouping of partitions in the external table; defining an expression property for a partition of the external table; defining partition statistics for a partition of the external table; or defining a column expression property for a column of a partition of the external table.

Example 64 is a method as in any of Examples 62-63, further comprising storing the metadata in a partition storage object on a shared storage platform associated with the database platform, wherein the shared storage platform is separate from the data storage platform.

Example 65 is a method as in any of Examples 62-64, wherein refreshing the metadata comprises one or more of: refreshing the metadata in response to any modification being made to the source directory; refreshing the metadata at threshold time periods; refreshing the metadata in response to a threshold number of modifications being made to the source directory; or refreshing the metadata in response to a client request to refresh the metadata.

Example 66 is a method as in any of Examples 62-65, further comprising reading multiple different file formats in the source directory.

Example 67 is a method as in any of Examples 62-66, wherein receiving the notification comprises one or more of: querying the data storage platform to determine whether any modifications have been made to the source directory; receiving a notification from the data storage platform that a modification has been made to the source directory; or receiving a notification from a client associated with the source directory, the notification indicating that the modification has been made to the source directory.

Example 68 is a method as in any of Examples 62-67, wherein defining the external table based on the source directory comprises: receiving an indication of a hierarchical structure in the source directory, the hierarchical structure defining folders and subfolders for data in the source directory; receiving an indication of a partitioning structure for data in the source directory; and defining partitions in the external table based on where files are uploaded within the hierarchical structure and further based on the partitioning structure.

Example 69 is a method as in any of Examples 62-68, wherein defining the partitions in the external table comprises generating metadata for the partitions in the external table and pointing the metadata to the appropriate folders and subfolders in the source directory.

Example 70 is a method as in any of Examples 62-69, wherein receiving the notification comprises means for receiving a notification that a certain subfolder within the source directory has been modified.

Example 71 is a method as in any of Examples 62-70, further comprising: identifying a certain partition in the external table that corresponds with the certain subfolder within the source directory; and generating change tracking metadata for the certain partition indicating how the certain subfolder was modified and when the certain subfolder was modified.

Example 72 is a processor that is programmable to execute instructions stored in non-transitory computer readable storage media, the instructions comprising: receiving, by a database platform, read access to a source directory in a data storage platform that is separate from the database platform; defining an external table based on the source directory; connecting the database platform to the external table such that the database platform has read access for the external table and does not have write access for the external table; generating metadata for the external table, the metadata comprising information about data stored in the external table; receiving a notification that a modification has been made to the source directory, the modification comprising one or more of an insert, a delete, or an update; and refreshing the metadata for the external table in response to the modification being made to the source directory.

Example 73 is a processor as in Example 72, wherein generating the metadata comprises one or more of: defining cumulative table metadata for the external table; defining a grouping expression property for a grouping of partitions in the external table; defining an expression property for a partition of the external table; defining partition statistics for a partition of the external table; or defining a column expression property for a column of a partition of the external table.

Example 74 is a processor as in any of Examples 72-73, wherein the instructions further comprise storing the metadata in a partition storage object on a shared storage platform associated with the database platform, wherein the shared storage platform is separate from the data storage platform.

Example 75 is a processor as in any of Examples 72-74, wherein refreshing the metadata comprises one or more of: refreshing the metadata in response to any modification being made to the source directory; refreshing the metadata at threshold time periods; refreshing the metadata in response to a threshold number of modifications being made to the source directory; or refreshing the metadata in response to a client request to refresh the metadata.

Example 76 is a processor as in any of Examples 72-75, wherein defining the external table based on the source directory comprises: receiving an indication of a hierarchical structure in the source directory, the hierarchical structure defining folders and subfolders for data in the source directory; receiving an indication of a partitioning structure for data in the source directory; and defining partitions in the external table based on where files are uploaded within the hierarchical structure and further based on the partitioning structure.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural, functional, object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations which, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, the appearance of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such a list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure.

What is claimed is:

1. A system comprising:
   at least one processor;
   a memory device including instructions, which when executed by the at least one processor, cause the at least one processor to perform operations comprising:
   connecting a database platform to an external table such that the database platform has read access for the external table and does not have write access for the external table;
   generating a materialized view over the external table;
   receiving a notification that a modification has been made to the external table, the modification comprising inserting at least one row of new data to the external table, the at least one row corresponding to a first micro-partition that includes a first portion of data from the external table prior to the inserting, the notification being received after inserting the at least one row of new data to the external table has been completed and based at least in part on scanning the external table to detect at least one change to the external table;
   in response to the notification indicating the modification to the external table, generating a new micro-partition different from the first micro-partition, the new micro-partition including the inserted at least one row of new data and the first portion of data from the external table, the new micro-partition comprising immutable one or more new contiguous units of storage, the new micro-partition being stored in persistent storage provided by the database platform; and
   generating a refreshed materialized view based at least in part on the generated new micro-partition such that the refreshed materialized view comprises a representation of the external table after the modification has been made.

2. The system of claim 1, wherein the external table comprises data that is stored outside of the database platform and is not managed by the database platform, and the modification further comprises deleting a second micro-partition, the second micro-partition including at least a second portion of the data from the external table, and the memory device includes further instructions, which when executed by the at least one processor, cause the at least one processor to perform further operations comprising:
   providing the refreshed materialized view to a client device in response to a request from the client device.

3. The system of claim 1, wherein the external table is based on a source location in a data storage platform, wherein the data storage platform is separate from the database platform.

4. The system of claim 3, wherein the receiving the notification comprises one or more of:
   querying the data storage platform to determine whether any modifications have been made to a source location;
   receiving a notification from the data storage platform that a modification has been made to the source location; or
   receiving a notification from a respective client device associated with a source directory, the notification indicating that the modification has been made to the source location.

5. The system of claim 1, wherein the memory device includes further instructions, which when executed by the at least one processor, cause the at least one processor to perform further operations comprising:
   determining content for the materialized view, wherein the determining the content comprises receiving an indication to generate the materialized view with the content.

6. The system of claim 1, wherein generating the refreshed materialized view comprises generating a new materialized view and removing an original materialized view that is stale with respect to the external table.

7. The system of claim 1, wherein the memory device includes further instructions, which when executed by the at least one processor, cause the at least one processor to perform further operations comprising:
receiving a query;
determining one or more micro-partitions in the external table that are necessary to respond to the query by reading metadata for the external table; and
determining whether part or all of the query can be satisfied by one or more materialized views.

8. The system of claim 7, wherein the memory device includes further instructions, which when executed by the at least one processor, cause the at least one processor to perform further operations comprising:
generating a query plan for responding to the query, the query plan comprising a plurality of discrete subtasks; and
assigning the plurality of discrete subtasks to one or more nodes of an execution platform,
wherein, in response to there being a matching materialized view that matches part or all of the query, at least one of the plurality of discrete subtasks comprises reading the matching materialized view, and
wherein, in response to there being no matching materialized view that matches part or all of the query, at least one of the plurality of discrete subtasks comprises reading the external table.

9. The system of claim 8, further comprising determining whether the matching materialized view is stale with respect to the external table.

10. The system of claim 1, further comprising generating metadata for the materialized view, the metadata comprising at least one of:
an identification of one or more micro-partitions of the external table that are materialized in the materialized view,
a minimum/maximum value pair for each of the one or more micro-partitions that are materialized in the materialized view, or
a timestamp for a most recent refresh of the materialized view.

11. The system of claim 10, wherein the memory device includes further instructions, which when executed by the at least one processor, cause the at least one processor to perform further operations comprising:
reading the timestamp for the most recent refresh of the materialized view; and
determining whether the materialized view is stale with respect to the external table based on the timestamp for the most recent refresh of the materialized view.

12. A method comprising:
connecting a database platform to an external table such that the database platform has read access for the external table and does not have write access for the external table;
generating, by the database platform, a materialized view over the external table;
receiving a notification that a modification has been made to the external table, the modification comprising inserting at least one row of new data to the external table, the at least one row corresponding to a first micro-partition that includes a first portion of data from the external table prior to the inserting, the notification being received after inserting the at least one row of new data to the external table has been completed and based at least in part on scanning the external table to detect at least one change to the external table;
in response to the notification indicating the modification to the external table, generating a new micro-partition different from the first micro-partition, the new micro-partition including the inserted at least one row of new data and the first portion of data from the external table, the new micro-partition comprising immutable one or more new contiguous units of storage, the new micro-partition being stored in persistent storage provided by the database platform;
generating a refreshed materialized view based at least in part on the generated new micro-partition such that the refreshed materialized view comprises a representation of the external table after the modification has been made; and
providing the refreshed materialized view to a client device in response to a request from the client device.

13. The method of claim 12, wherein the external table comprises data that is stored outside of the database platform and is not managed by the database platform, and the modification further comprises deleting a second micro-partition, the second micro-partition including at least a second portion of the data from the external table.

14. The method of claim 13, wherein receiving the notification comprises one or more of:
receiving a notification from a data storage platform that a modification has been made to a source location; or
receiving a notification from a respective client device associated with the source location, the notification indicating that the modification has been made to the source location.

15. The method of claim 12, further comprising determining content for the materialized view by receiving an indication to generate the materialized view with the content.

16. The method of claim 12, wherein generating the refreshed materialized view comprises generating a new materialized view.

17. The method of claim 12, further comprising:
receiving a query;
determining one or more micro-partitions in the external table that are necessary to respond to the query by reading metadata for the external table; and
determining whether part or all of the query can be satisfied by a matching materialized view.

18. The method of claim 17, further comprising:
generating a query plan for responding to the query, the query plan comprising a plurality of discrete subtasks; and
assigning the plurality of discrete subtasks to one or more nodes of an execution platform,
wherein, in response to there being the matching materialized view, at least one of the plurality of discrete subtasks comprises reading the matching materialized view, and
wherein, in response to there being no matching materialized view, at least one of the plurality of discrete subtasks comprises reading the external table.

19. The method of claim 18, further comprising determining whether a corresponding materialized view is stale with respect to the external table.

20. The method of claim 12, further comprising generating metadata for the materialized view, the metadata comprising at least one of:

an identification of one or more micro-partitions of the external table that are materialized in the materialized view, a minimum/maximum value pair for each of the one or more micro-partitions that are materialized in the materialized view, or a timestamp for a most recent refresh of the materialized view.

21. The method of claim 20, further comprising:
reading a timestamp for a most recent modification to the external table;
reading the timestamp for the most recent refresh of the materialized view; and
determining whether the materialized view is stale with respect to the external table based on the timestamp for the most recent refresh of the materialized view.

22. A non-transitory computer-readable medium comprising instructions, which when executed by at least one processor, cause the at least one processor to perform operations comprising:
connecting a database platform to an external table such that the database platform has read access for the external table and does not have write access for the external table;
generating, by the database platform, a materialized view over the external table;
receiving a notification that a modification has been made to the external table, the modification comprising inserting at least one row of new data to the external table, the at least one row corresponding to a first micro-partition that includes a first portion of data from the external table prior to the inserting, the notification being received after inserting the at least one row of new data to the external table has been completed and based at least in part on scanning the external table to detect at least one change to the external table;
in response to the notification indicating the modification to the external table, generating a new micro-partition different from the first micro-partition, the new micro-partition including the inserted at least one row of new data and the first portion of data from the external table, the new micro-partition comprising immutable one or more new contiguous units of storage, the new micro-partition being stored in persistent storage provided by the database platform;
generating a refreshed materialized view based at least in part on the generated new micro-partition such that the refreshed materialized view comprises a representation of the external table after the modification has been made,
wherein the external table is based on a source location in a data storage platform, wherein the data storage platform is separate from the database platform; and
providing the refreshed materialized view to a client device in response to a request from the client device.

23. The non-transitory computer-readable medium of claim 22, wherein the external table comprises data that is stored outside of the database platform and is not managed by the database platform, the modification further comprises deleting a second micro-partition, the second micro-partition including at least a second portion of the data from the external table, the non-transitory computer-readable medium comprises further instructions, which when executed by the at least one processor, further cause the at least one processor to perform further operations comprising:

determining content for the materialized view by receiving an indication to generate the materialized view with the content.

24. The non-transitory computer-readable medium of claim 22, wherein receiving the notification comprises at least one of:
receiving a notification from the data storage platform that a modification has been made to a source location; or
receiving a notification from a respective client device associated with the source location, the notification indicating that the modification has been made to the source location.

25. The non-transitory computer-readable medium of claim 22, wherein the non-transitory computer-readable medium comprises further instructions, which when executed by the at least one processor, further cause the at least one processor to perform further operations comprising:
receiving a query;
determining one or more micro-partitions in the external table that are necessary to respond to the query by reading metadata for the external table;
determining whether a matching materialized view has been generated for part or all of the query;
generating a query plan for responding to the query, the query plan comprising a plurality of discrete subtasks; and
assigning the plurality of discrete subtasks to one or more nodes of an execution platform,
wherein, in response to there being the matching materialized view, at least one of the plurality of discrete subtasks comprises reading a corresponding materialized view, and
wherein, in response to there being no matching materialized view, at least one of the plurality of discrete subtasks comprises reading the external table.

26. The non-transitory computer-readable medium of claim 25, wherein the non-transitory computer-readable medium comprises further instructions, which when executed by the at least one processor, further cause the at least one processor to perform further operations comprising:
generating a query plan for responding to the query, the query plan comprising a plurality of discrete subtasks;
assigning the plurality of discrete subtasks to one or more nodes of an execution platform,
wherein, in response to there being the matching materialized view, at least one of the plurality of discrete subtasks comprises reading the matching materialized view, and
wherein, in response to there being no matching materialized view, at least one of the plurality of discrete subtasks comprises reading the external table; and
determining whether a corresponding materialized view is stale with respect to the external table.

27. The non-transitory computer-readable medium of claim 22, wherein the non-transitory computer-readable medium comprises further instructions, which when executed by the at least one processor, further cause the at least one processor to perform further operations comprising:
generating metadata for the materialized view, the metadata comprising at least one of:
an identification of one or more micro-partitions of the external table that are materialized in the materialized view, a minimum/maximum value pair for each of the one or more micro-partitions that are materialized in the materialized view, or a timestamp for a most recent refresh of the materialized view.

28. The non-transitory computer-readable medium of claim 27, wherein the non-transitory computer-readable medium comprises further instructions, which when executed by the at least one processor, further cause the at least one processor to perform further operations comprising:

reading a timestamp for a most recent modification to the external table;

reading the timestamp for the most recent refresh of the materialized view; and determining whether the materialized view is stale with respect to the external table based on the timestamp for the most recent refresh of the materialized view.

\* \* \* \* \*